US006180865B1

(12) United States Patent
Ishiguro

(10) Patent No.: US 6,180,865 B1
(45) Date of Patent: Jan. 30, 2001

(54) MELODY PERFORMANCE TRAINING APPARATUS AND RECORDING MEDIUMS WHICH CONTAIN A MELODY PERFORMANCE TRAINING PROGRAM

(75) Inventor: Shiro Ishiguro, Fussa (JP)

(73) Assignee: Casio Computer Co., Ltd., Tokyo (JP)

( * ) Notice: Under 35 U.S.C. 154(b), the term of this patent shall be extended for 0 days.

(21) Appl. No.: 09/480,505

(22) Filed: Jan. 10, 2000

(30) Foreign Application Priority Data

Jan. 19, 1999 (JP) ..................................... 11-011067

(51) Int. Cl.[7] ............................ G10H 7/00; G09B 15/02

(52) U.S. Cl. ........................ 84/609; 84/470 R; 84/477 R; 84/478

(58) Field of Search .................... 84/601–602, 609–612, 84/622–625, 634–636, 649–652, 470 R, 477 R, 478, 485 R, 479 A

(56) References Cited

U.S. PATENT DOCUMENTS 3,744,366 7/1973 Del Castillo .
3,885,490 5/1975 Gullickson .
3,958,487 5/1976 Goldman .
4,040,324 8/1977 Green .
4,307,645 12/1981 Rauchi .
4,314,499 2/1982 Olsen .
4,331,062 5/1982 Rogers .
4,366,741 1/1983 Titus .
4,437,378 3/1984 Ishida et al. .
5,069,104 12/1991 Shibukawa .
5,286,909 2/1994 Shibukawa .

FOREIGN PATENT DOCUMENTS 0 192 974 9/1986 (EP) .

*Primary Examiner*—Paul Ip
*Assistant Examiner*—Marlon Fletcher
(74) *Attorney, Agent, or Firm*—Frishauf, Holtz, Goodman, Langer & Chick, P.C.

(57) ABSTRACT

Prestored melody data is read out as the performance of the melody progresses. When event data contained in the read melody data represents a key to be depressed for a melody performance, the key represented by the event data is indicated to a performer. When the performer does not depress the key even when a timing when the key is to be depressed has passed, reading the melody data is stopped until the key is depressed. When the performer depresses the key before the timing when the key is to be depressed, relevant event contained in the melody data to be read out in a time period between the time when the key was actuated and the time when the timing at which the key is to be depressed comes is rapidly read out. When the event data rapidly read out contains volume control event data, the processing of the event data is changed such that the volume of the musical sound to be produced is minimized.

8 Claims, 19 Drawing Sheets

| CHANNEL | MIDI DATA |
|---|---|
| | MELODY PART DATA |
| | DRUM PART DATA |
| | BASE PART DATA |
| | CODE 1 PART DATA |
| | CODE 2 PART DATA |
| | CODE 3 PART DATA |
| | |

MELODY PERFORMANCE TRAINING APPARATUS AND RECORDING MEDIUMS WHICH CONTAIN A MELODY PERFORMANCE TRAINING PROGRAM

TECHNICAL FIELD

The present invention relates to melody performance training apparatus and recording mediums which records a melody performance training program.

BACKGROUND ART

A performance training apparatus which has the navigation function of guiding a performer's performance is known conventionally. For example, in an electronic keyboard instrument having the navigation function, light emitting elements such as light emitting diodes are provided in correspondence to the keys of a keyboard. As the performance of a pre-stored melody progresses, the performer is caused to recognize a key to be depressed and a timing of depressing the key by causing a light emitting element for the key to emit light. When the performer does not depress the key even when the timing of depressing the key has come, the performance of the melody is stopped to thereby synchronize the performer's performance with the progress of performance of the melody.

When the key is depressed before the key depression timing comes, however, no appropriate measures cannot be taken properly, and a musical sound based on the depression of the key is produced. However, production of this musical sound cannot be synchronized with production of a musical sound of another part such as an accompaniment sound contained in the melody data. Some other conventional apparatus are arranged such that when a key is depressed before a proper timing at which the key is to be depressed, a musical sound is not produced at that timing, and that when the proper timing has come, the musical sound is produced. Since no musical sound is produced when the key is depressed, however, the performer will greatly feel that something is wrong.

DISCLOSURE OF THE INVENTION

It is therefor an object of the present invention to synchronize, in response to a key being depressed before a proper timing of depression of the key comes, production of a musical sound of a melody based on depression of the key with production of a musical sound of another part of the melody without giving any feeling of wrongness to the performer to thereby guide the performer's performance appropriately.

According to one aspect of the present invention, there is provided a melody performance training apparatus comprising:

- a plurality of elements to be actuated for performing a melody;
- storage means which contains melody data which includes a plurality of pairs of event data representing one of the plurality of elements to be actuated, and corresponding time data representing a timing when the element represented by the event data is to be actuated;
- data reading means for sequentially reading the plurality of pairs of event data and time data included in the melody data from the storage means; and
- reading control means, responsive to a particular one of the plurality of elements represented by event data of one of the plurality of pairs of event data and corresponding time data read by the data reading means being not actuated even when a timing at which the particular element is to be actuated has come, the timing being represented by the time data corresponding to the event data read out by the data reading means, for stopping the data reading means from reading the remaining portion of the melody data until the particular element is actuated, and responsive to the particular element being actuated before the timing when the particular element is to be actuated, for causing the data reading means to rapidly read from the storage means a relevant portion of the melody data to be read in a time period between the time when the particular element was actuated and a time when the timing at which the particular element is to be actuated comes.

According to this composition, even when the particular element is actuated before the timing when the particular element is to be actuated, performance of a part of the melody data is synchronized-with performance of another part of the melody data and the performer has no feeling that something is wrong.

According to another aspect of the present invention, there is also provided a melody performance training apparatus comprising:

- a plurality of elements to be actuated for performing a melody;
- storage means which contains melody data which includes a plurality of pairs of event data representing one of the plurality of elements to be actuated, and corresponding time data representing a timing when the element represented by the event data is to be actuated;
- data reading means for sequentially reading the plurality of pairs of event data and corresponding time data included in the melody data from the storage means;
- performance specifying means, responsive to the event data read by the data reading means representing a particular one of the plurality of elements to be actuated, for specifying the particular element; and
- reading control means, responsive to the particular element being not actuated even when a timing at which the particular element is to be actuated has come, the timing being represented by the time data corresponding to the event data read out by said data reading means, for stopping the data reading means from reading the remaining portion of the melody data until the particular element is actuated, and responsive to the particular element being actuated before the timing when the particular element is to be actuated, for causing the data reading means to rapidly read from the storage means a relevant portion of the melody data to be read in a time period between the time when the particular element was actuated and a time when the timing at which the particular element is to be actuated comes.

According to the composition of the present invention, even when the particular element, specified by the stored melody data, is actuated before the timing when the particular element is to be actuated, performance of a part of the melody data is synchronized with performance of another part of the melody data and the performer has no feeling that something is wrong.

According to still another aspect of the present invention, there is also provided a recording medium which contains a computer readable program for causing a computer to perform a process which comprises the steps of:

- sequentially reading a plurality of pairs of event data representing one of a plurality of elements to be actuated for performing a melody, and corresponding time data representing a timing when the element represented by the event data is to be actuated, the plurality of pairs of event data and corresponding time data composing melody data, from storage means which contains the melody data; and in response to a particular one of the plurality of elements represented by event data of one of the plurality of event data and corresponding time data read in the reading step being not actuated even when a timing at which the particular element is to be actuated has come, the timing being represented by the time data corresponding to the event data read out in the data reading step, stopping the reading step from reading the remaining portion of the melody data until the particular element is actuated, and in response to the particular element being actuated before the timing when the particular element is to be actuated, causing the reading step to rapidly read a relevant portion of the melody data to be read in a time period between the time when the particular element was actuated and the time when the timing at which the particular element is to be actuated comes.

According to this composition, melody performance can be trained in a processor such as a computer such that even when the particular element is actuated before the timing when the particular element is to be actuated, performance of a part of the melody data is synchronized with performance of another part of the same melody data and the performer has no feeling that something is wrong.

According to a further aspect of the present invention, there is also provided a recording medium which contains a computer readable program for causing a computer to perform a process which comprises the steps of:

sequentially reading a plurality of pairs of event data representing one of a plurality of elements to be actuated for performing a melody, and corresponding time data representing a timing when the element represented by the event data is to be actuated, the plurality of pairs of event data and corresponding time data composing melody data, from storage means which contains the melody data;

in response to the data reading step reading event data of one of the plurality of pairs of event data and corresponding time data which represents a particular one of the plurality of elements to be actuated, specifying the particular element; and in response to the particular element being not actuated even when a timing at which the particular element is to be actuated has come, the timing being represented by the time data corresponding to the event data read out in said reading step, stopping said reading step from reading the remaining portion of the melody data until the particular element is actuated, and in response to the particular element being actuated before the timing when the particular element is to be actuated, causing the reading step to rapidly read a relevant portion of the melody data to be read in a time period between the time when the particular element was actuated and the time when the timing at which the particular element is to be actuated comes.

According to this composition, training a melody performance can be realized in a processor such as a computer such that even when the particular element, specified by the stored melody data, is actuated before the timing when the particular element is to be actuated, performance of a part of the melody data is synchronized with performance of another part of the melody data and the performer has no feeling that something is wrong.

BEST MODE FOR CARRYING OUT THE INVENTION

Figure 1:
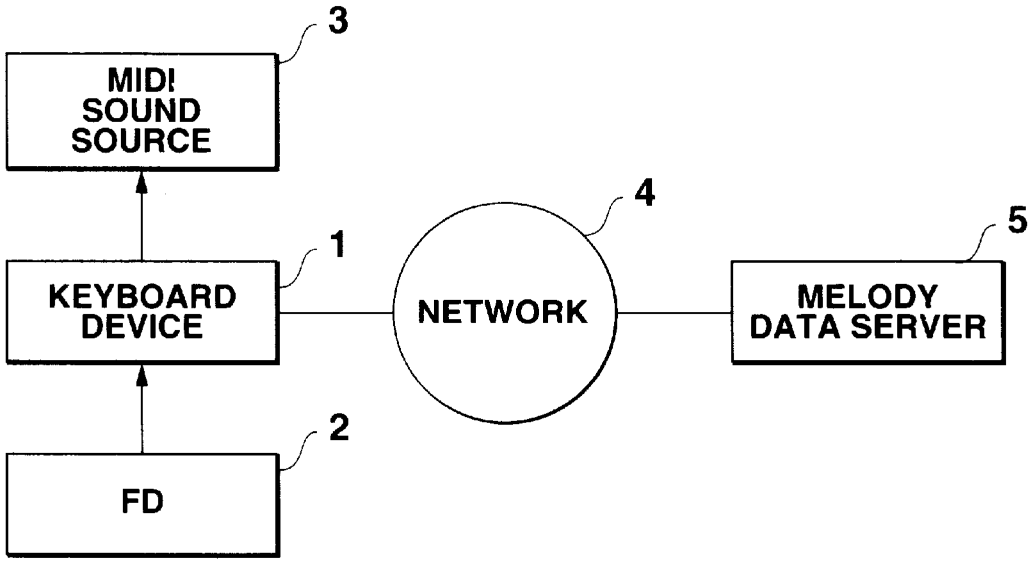
FIG. 1 illustrates the composition of a system as an embodiment of the present invention.

A melody performance training apparatus as a preferred embodiment of the present invention will be described next, by taking a keyboard device as an example, with reference to the accompanying drawings. FIG. 1 illustrates the composition of a system which includes the keyboard device 1, which drives a FD (floppy disk) 2 as storage means which stores melody data to provide MIDI data to a MIDI sound source 3. The melody data is received from a melody data sever 5 via a network (telecommunication lines) 4 of the internet.

Figure 2:
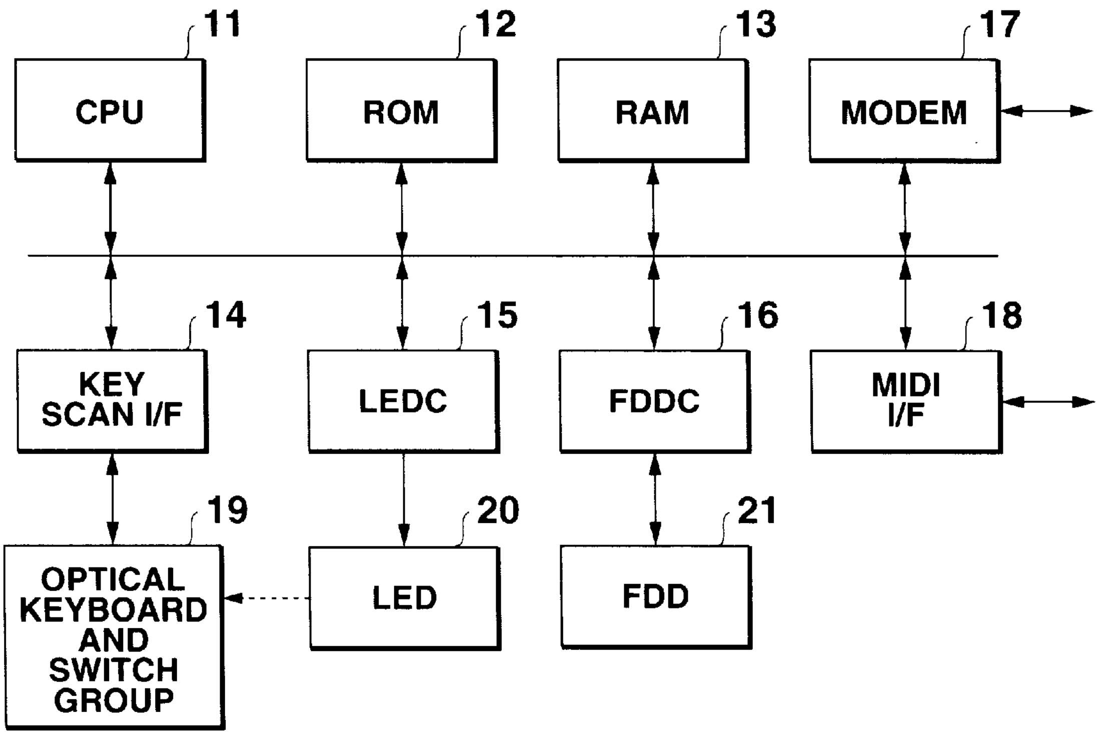
FIG. 2 is a block diagram of a keyboard device of the embodiment.

FIG. 2 is a block diagram of the keyboard device. A CPU 11 of the keyboard device is connected via a system bus to a ROM 12, a RAM 13, a key scan interface 14, a LEDC (LED controller) 15, a FDDC (floppy disk driver controller) 16, a modem 17, and a MIDI interface 18.

The ROM 12 contains a melody performance-training program executed by the CPU 11. The RAM 13 temporarily stores various data processed by the CPU 11. The key scan interface 14 is connected to an optical keyboard and switch group 19 to scan the operational state of the group 19 and provides a corresponding signal to the CPU 11. The LEDC 15 controls the turning on and off of an LED 20 as light emitting means provided in correspondence to each key, which can be referred to as an element to be actuated, herein. The FDDC 16 controls an FDD (floppy disk driver) 21.

The modem 17 as communication control means includes a network control unit (NCU) (not shown) which controls connection of the modem to the telecommunication line or network 4, and receives and demodulates melody data from the melody data sever 5 in accordance with a reception instruction from the CPU 11. The FDDC 16 and FDD 21 record received melody data in the floppy disk 2. The MIDI interface 18 delivers to the MIDI sound source 3 the MIDI data created by the CPU 11.

Figures 3A, 3B:
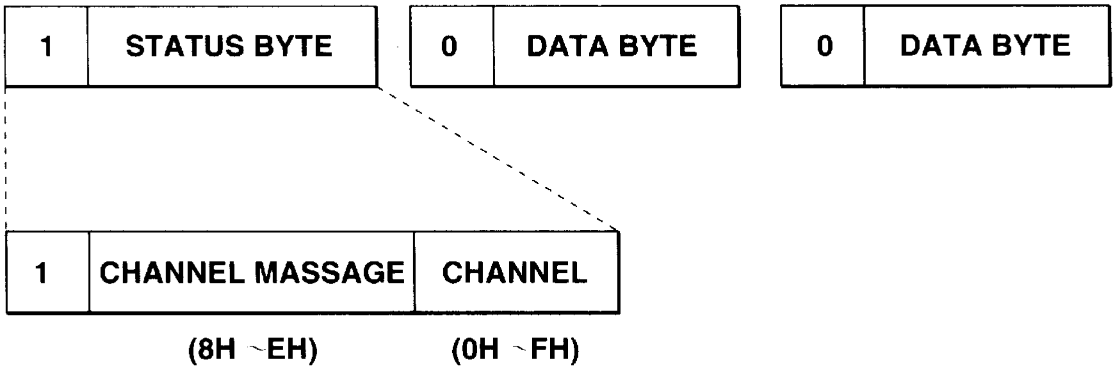
FIGS. 3A and 3B illustrate a format of MIDI data and the composition of music data for each channel, respectively.

FIG. 3A shows a format of MIDI data, which is composed of a one-byte status byte (head bit=1) and a one- or two-byte data byte (head bit=0) and is used as a channel message or a system message depending on an object of its use. The status byte is composed of three bits representing the kind of massage and four bits representing a channel number n. For example, "000", "001", and "100" represent "note off" data, "note on" data, and a program change command which involves a change of tone quality of a melody concerned, respectively, as the kind of channel message.

FIG. 3B illustrates a plurality of parts of melody data, for example, a melody part, a drum part, a base part and three code parts, specified for each channel. In the navigation function, the melody part is generally specified as a part for performance guidance.

Figure 4:
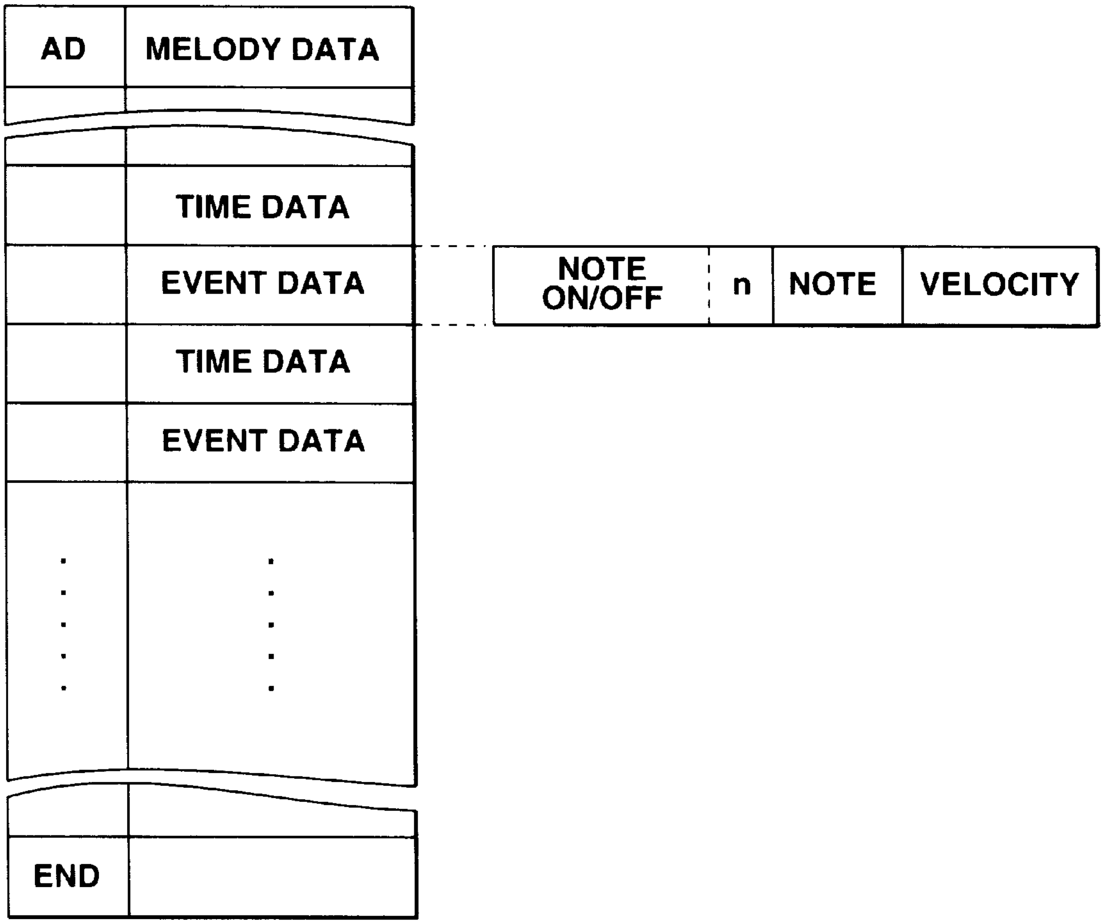
FIG. 4 illustrates a format of melody data of the MIDI data.

As shown in FIG. 4, the melody part is composed of alternately arranged time data and event data for each of addresses in an address register AD. The event data is composed of note on or off data and a channel number as status bytes, and note data (representing a key number) and velocity data as data bytes. An end address of the melody part contains END data.

The operation of the performance training apparatus of the embodiment will be described based on a flowchart representing a program executed by the CPU 11.

Figure 5:
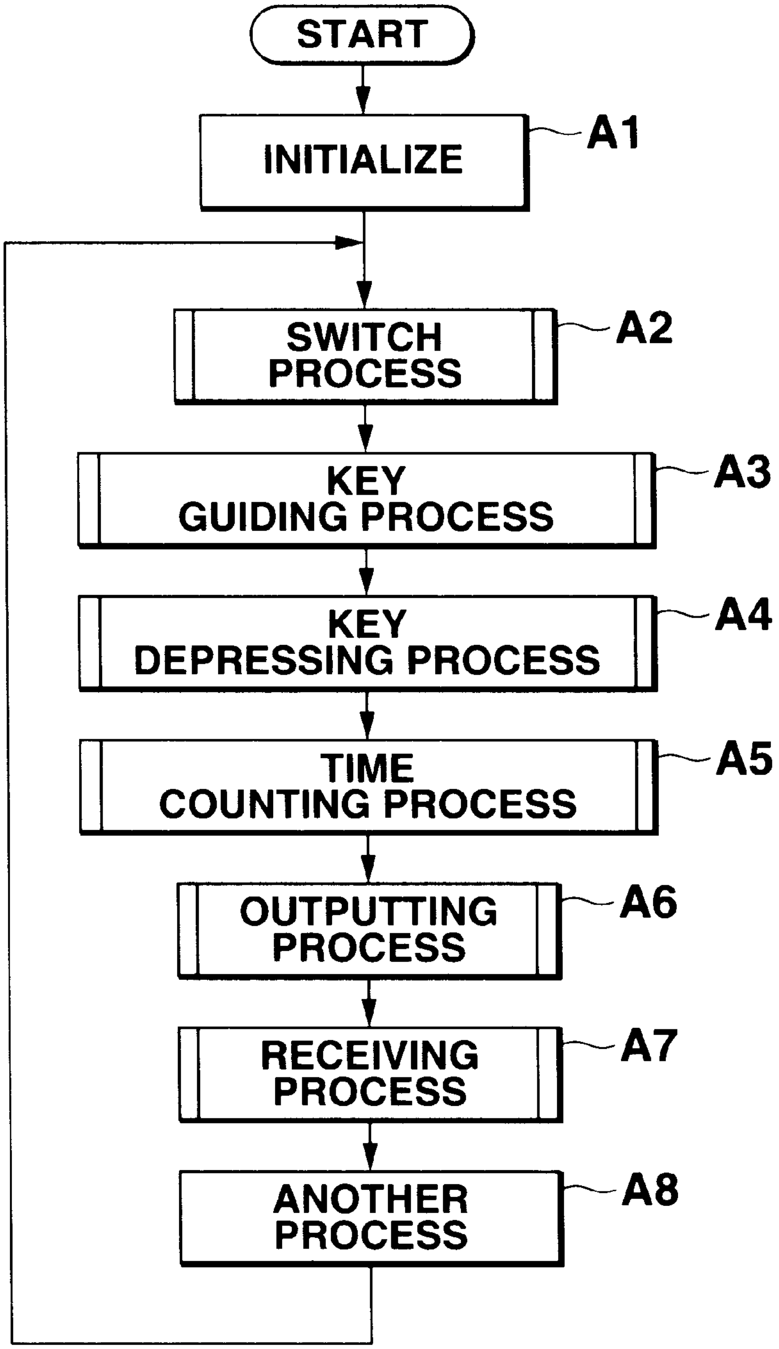
FIG. 5 is a flowchart of a program executed by a CPU of FIG. 2.

FIG. 5 shows a main flow of the flowchart which includes a looping operation which repeats after a predetermined initializing process (step A1), a switch process (step A2), a key guiding process (step A3), a key depressing process (step A4), a time counting process (step A5), an outputting process (step A6), a receiving process (step A7), and another process (step A8).

Figure 6:
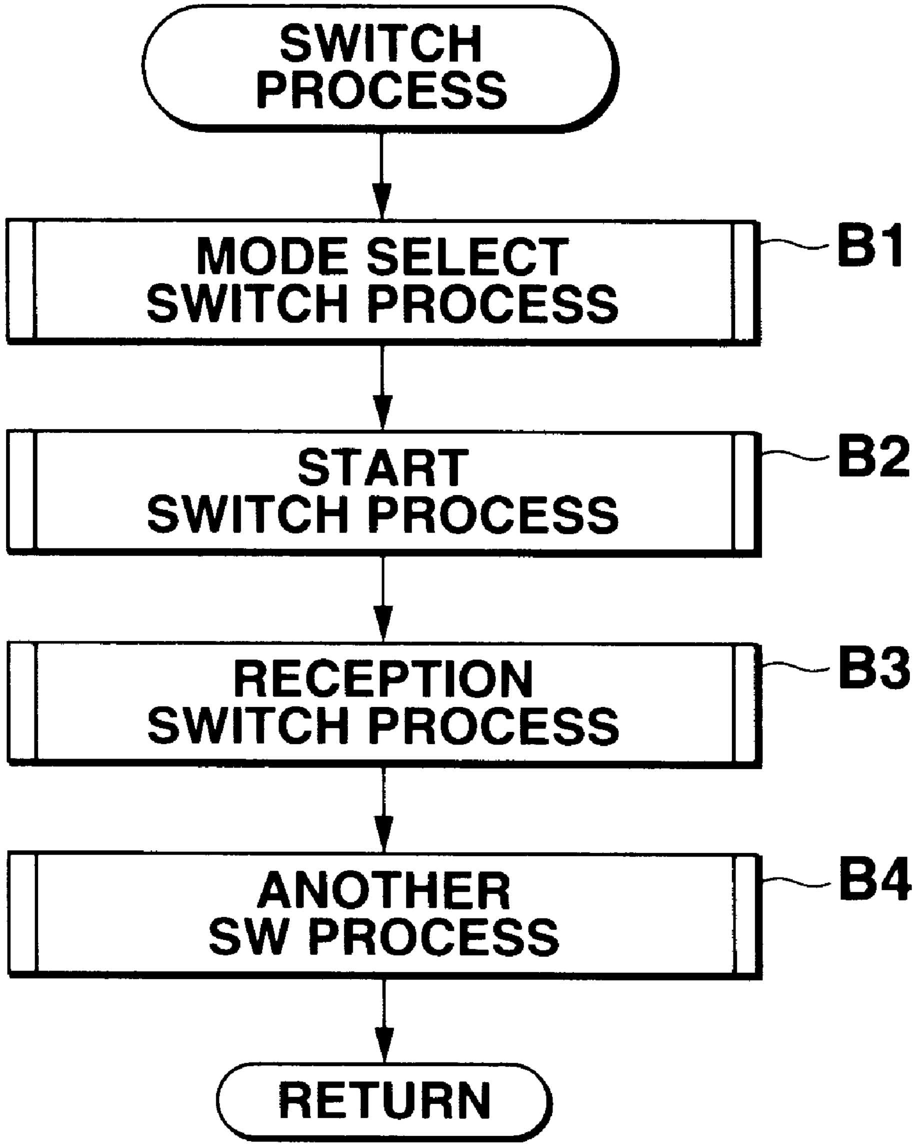
FIG. 6 is a flowchart of a switch process of FIG. 5.

FIG. 6 is a flowchart of the switch process (step A2) of the main flow of FIG. 5. In this step, the CPU 11 scans the switch group of FIG. 2, and effects a mode select switch process (step B1), a start switch process (step B2), a receiving process (step B3) and another switch process (step B4) and then returns its control to the main flow of FIG. 5.

Figure 7:
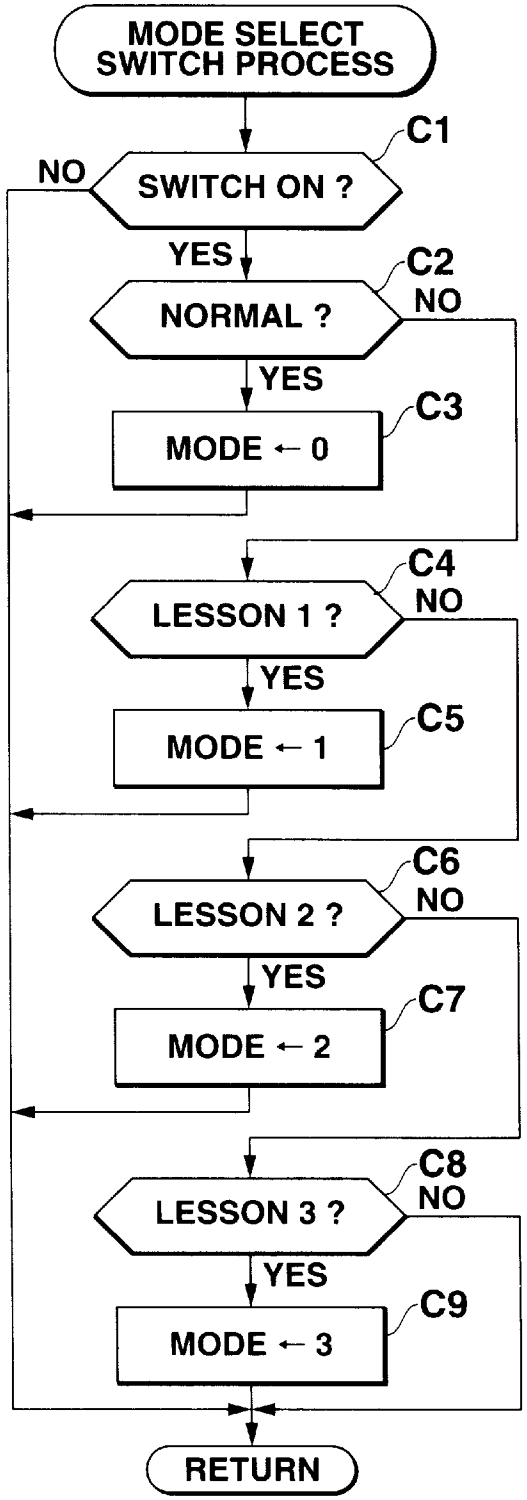
FIG. 7 is a flowchart of a mode selecting switch process as a part of the switch process of FIG. 6.

FIG. 7 shows a flowchart of the mode select switch process (step B1) of FIG. 6. In this process, the CPU 11 determines whether any one of the mode select switches which include a normal switch, a lesson 1 switch, a lesson 2 switch and a lesson 3 switch is turned on (step C1). If otherwise, the CPU 11 terminates this process. If any one of the switches is turned on, the CPU 11 effects a process corresponding to the turning on of the mode select switch.

The CPU 11 then determines whether the normal switch has been turned on (step C2). If it has been turned on, the CPU 11 sets a mode register MODE to "0" (step C3). Then, the CPU 11 determines whether the lesson 1 switch has been turned on (step C4). If it has been turned on, the CPU 11 sets the mode register MODE to "1" (step C5). The CPU 11 then determines whether the lesson 2 switch has been turned on (step C6). If it has been turned on, the CPU 11 sets the mode register MODE to "2" (step C7). The CPU 11 then determines whether the lesson 3 switch has been turned on (step C8) If it has been turned on, the CPU 11 then sets the mode register MODE to "3" (step C9).

When the mode register MODE is "0", a general normal performance mode is set in which a musical sound is produced only by a performance at the keyboard. The values "1"–"3" of the mode register MODE each indicate a performance mode based on the navigation function which guides the performance of melody data in a floppy disk. The value "1" of the mode register MODE indicates an "ANY key" mode in which a musical sound of melody data is produced when any key is depressed irrespective of a pitch of the melody data. The value "2" of the mode register MODE indicates a performance mode in which a musical sound is produced when a (light emitting) key corresponding to the pitch of melody data is depressed correctly. The value "3" of the mode register MODE indicates a mode in which melody data is read automatically irrespective of the performance and in which a musical sound of the melody data is produced when a corresponding guided key is depressed. When a value corresponding to a each of the mode select switches is set in the mode register MODE, the CPU 11 terminates this process and then returns its control to the switch process of FIG. 6.

Figure 8:
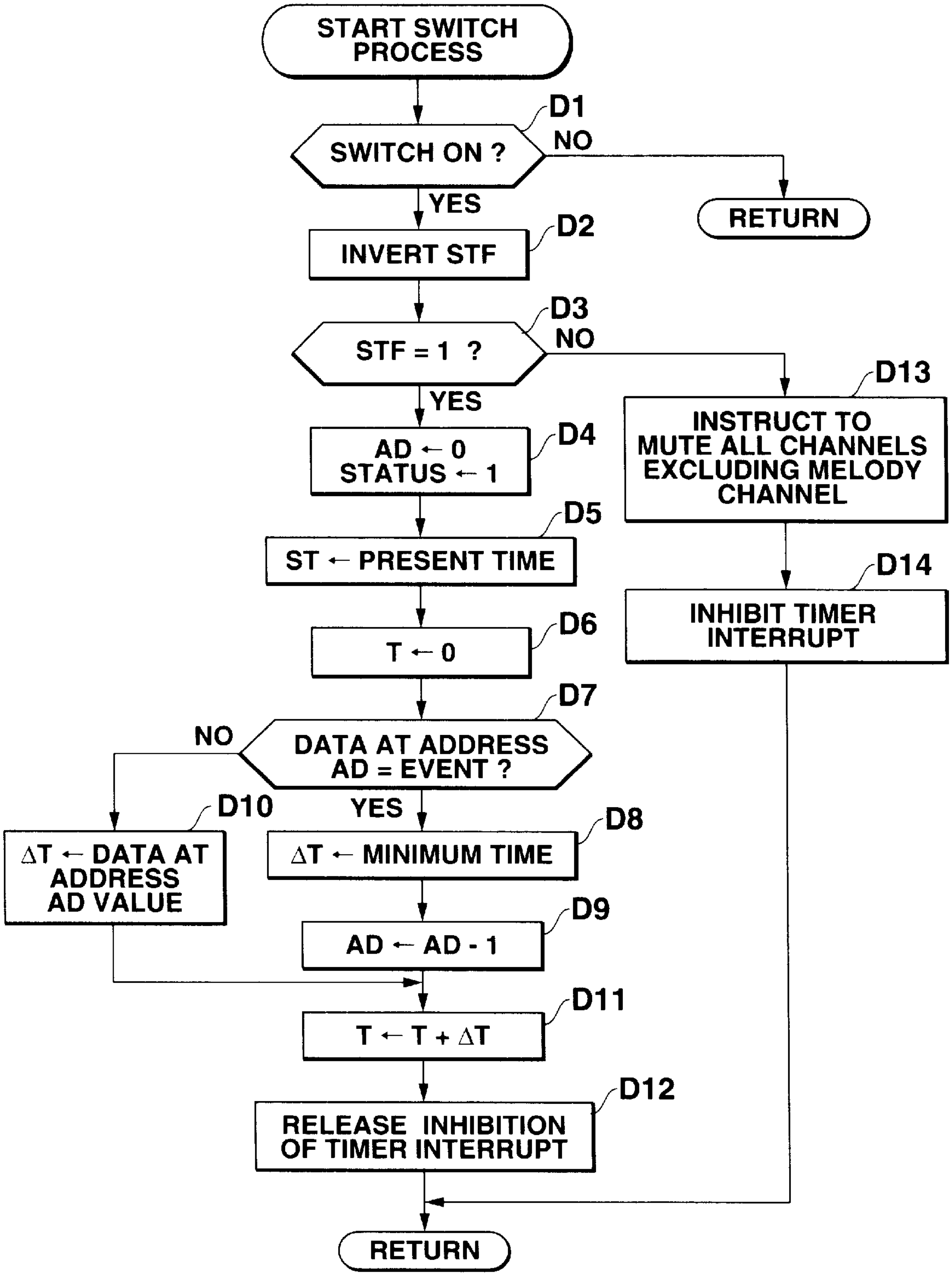
FIG. 8 is a flowchart of a start switch process as a part of the switch process of FIG. 6.

FIG. 8 is a flowchart indicative of the start switch process (step B2) as a part of the switch process of FIG. 6. In this process, the CPU 11 determines whether the start switch has been turned on (step D1). If otherwise, the CPU 11 terminates this process. If it has been turned on, the CPU 11 inverts a start flag STF (step D2), and then determines whether the STF is "1" (step D3).

If the start flag STF is "1", the CPU 11 then sets an address register AD to "0" or a head address of the melody data, and a register STATUS to "1" (step D4). The value of the register STATUS is set in the key depressing process to be described later. When the value of the register STATUS is "1", it is meant that a timing of depressing a key coincides with a timing of starting to produce a musical sound of the melody data concerned. When the value of the register STATUS is "2", it is meant that no key is depressed even after the timing of starting to produce a musical sound of the melody data has passed or that the timing of depressing the key is delayed. When the value of the register STATUS is set to "3", it is meant that the key has been depressed before the timing of starting to produce a musical sound of the melody data comes or that the timing of depressing the key is too early.

After step D4, the CPU 11 stores data representing the present time in a register ST (step D5), and then sets "0" in a time register T (step D6). The CPU 11 then determines whether a value at an address indicated by a value (=0) of an address register AD in a melody data storage area of the RAM 13 is event data (step D7) or whether the head of the melody data is event data or time data. If it is event data, the CPU 11 sets a minimum time contained in the MIDI data in a register ΔT (step D8), decrements the value of the address register AD by "1" (step D9) to return the address by one. This decrementing step is required for the key guiding process to be described later. When the head of the melody data is not event data, but time data in step D7, the CPU 11 sets the time data in the register ΔT (step D10).

After decrementing the address AD in step D9, or setting time data in the register ΔT in step D10, the CPU 11 adds the value of the register ΔT to the value of the time register T for updating purposes (step D11). Then, the CPU 11 releases the inhibition of timer interrupt (step D12).

When the start flag STF is zero in step D3, the CPU 11 instructs all the channels to mute the musical sounds, excluding a melody channel (step D13), and inhibits the timer interrupt (step D14).

After releasing the inhibition of the timer interrupt in step D12 or inhibiting the timer interrupt in D14, the CPU 11 terminates this process, and then returns its control to the switch process of FIG. 6.

Figure 9:
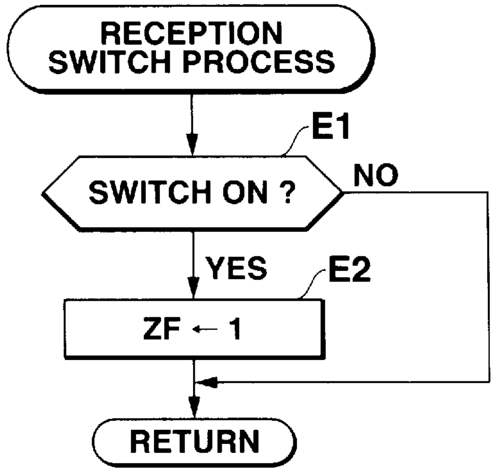
FIG. 9 is a flowchart of a reception switch process as a part of the switch process of FIG. 6.

FIG. 9 shows a flowchart of the reception switch process (step B3) as a part of the switch process, in which the CPU 11 determines whether the reception switch has been turned on (step E1). If otherwise, the CPU 11 terminates this process. If it is turned on, the CPU 11 sets a reception flag ZF to "1" (step E2), terminates this process and then returns its control to the switch step of FIG. 6.

Figure 10:
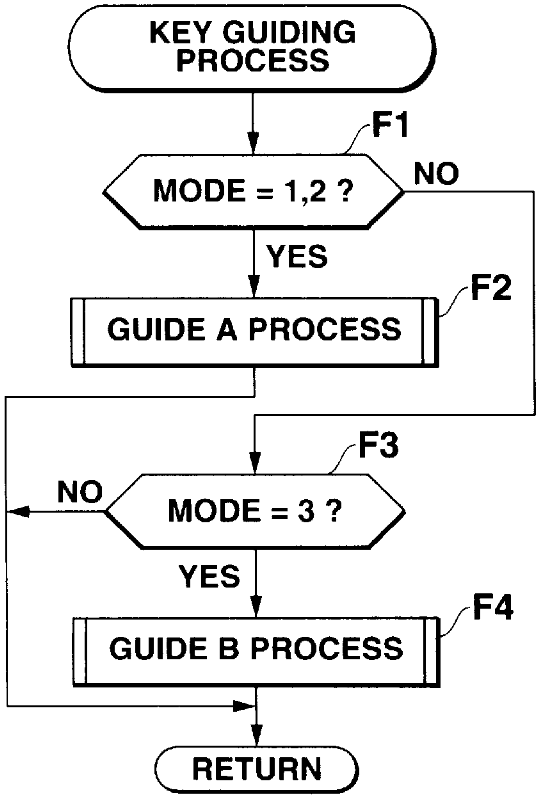
FIG. 10 is a flowchart of a key guiding process as a part of the flowchart of FIG. 5.

FIG. 10 shows a flowchart of the key guiding process (step A3) of the main flow of FIG. 5. In this process, the CPU 11 effects the key guiding process depending on a value of the mode register MODE, in which the CPU 11 determines whether the value of the mode register MODE is 1 (step F1). If it is 1, the CPU 11 executes a guide A process (step F2). If the value of the mode register MODE is neither 1 nor 2, the CPU 11 determines whether the value of the mode register MODE is 3 (step F3). If it is 3, the CPU 11 executes a guide B process (step F4).

Figure 11:
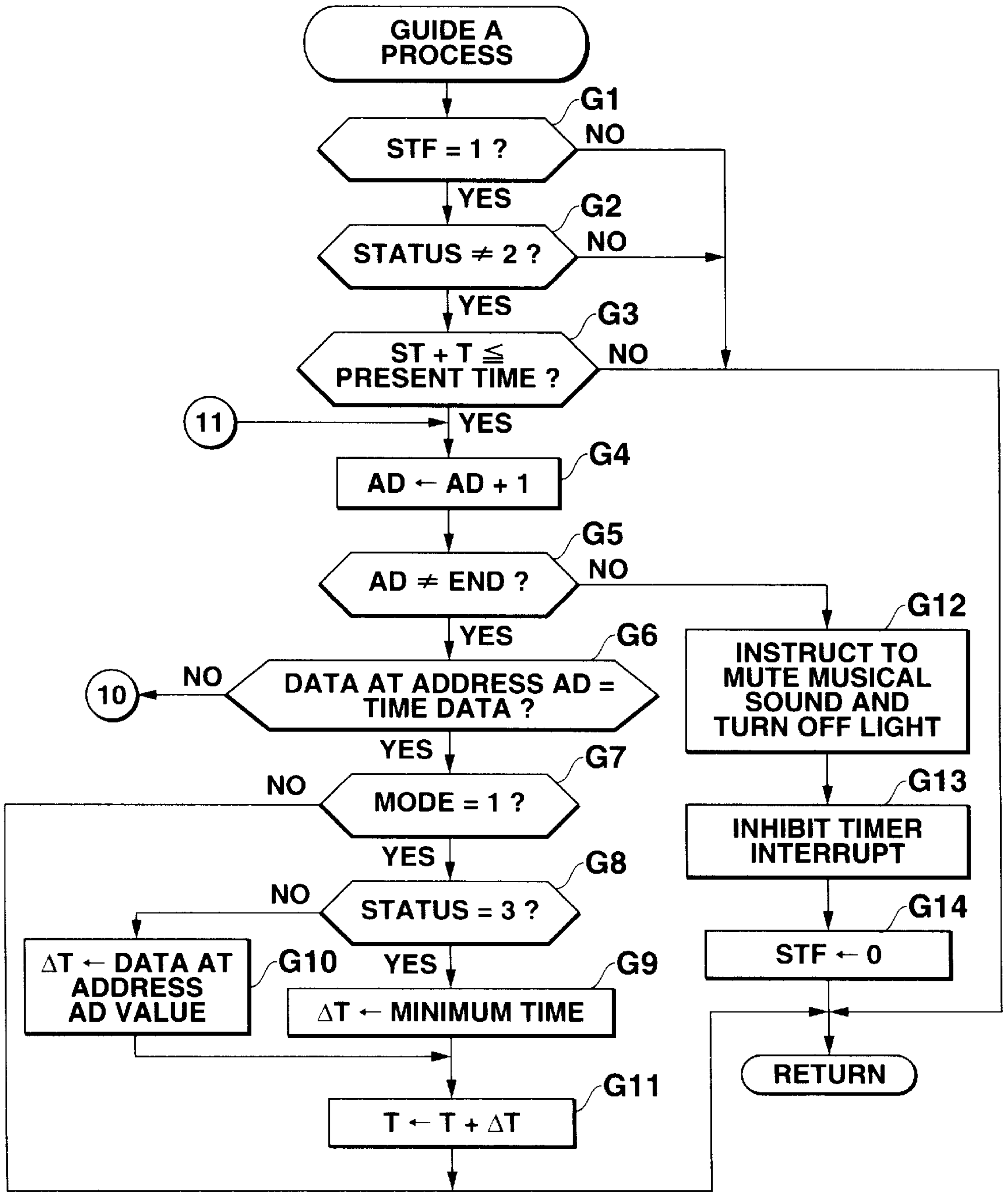
FIG. 11 is a flowchart of a part of a guide A process as a part of the key guiding process of FIG. 10.
Figure 12:
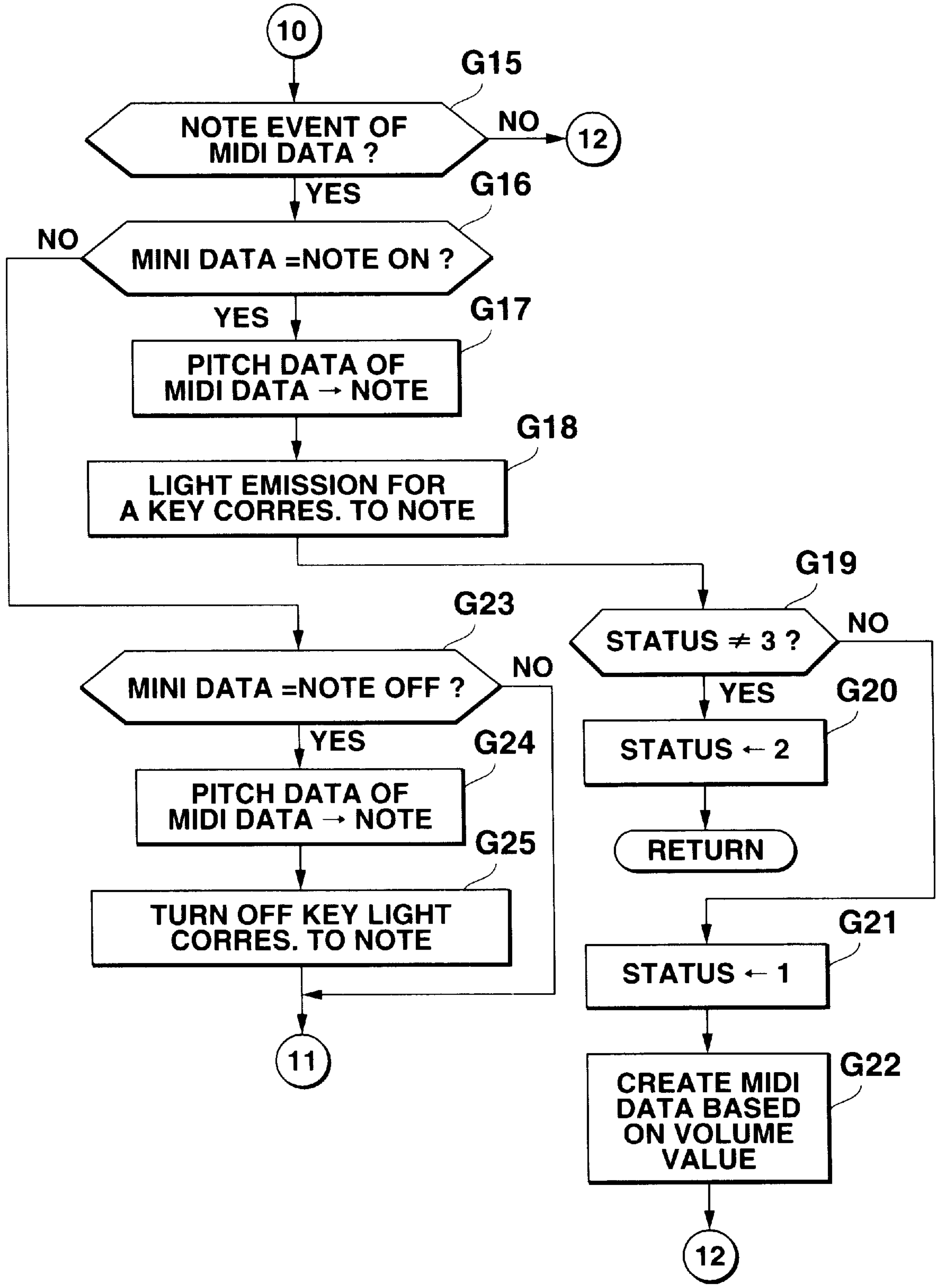
FIG. 12 is a flowchart of a part of the guide A process continuing from FIG. 11.
Figure 13:
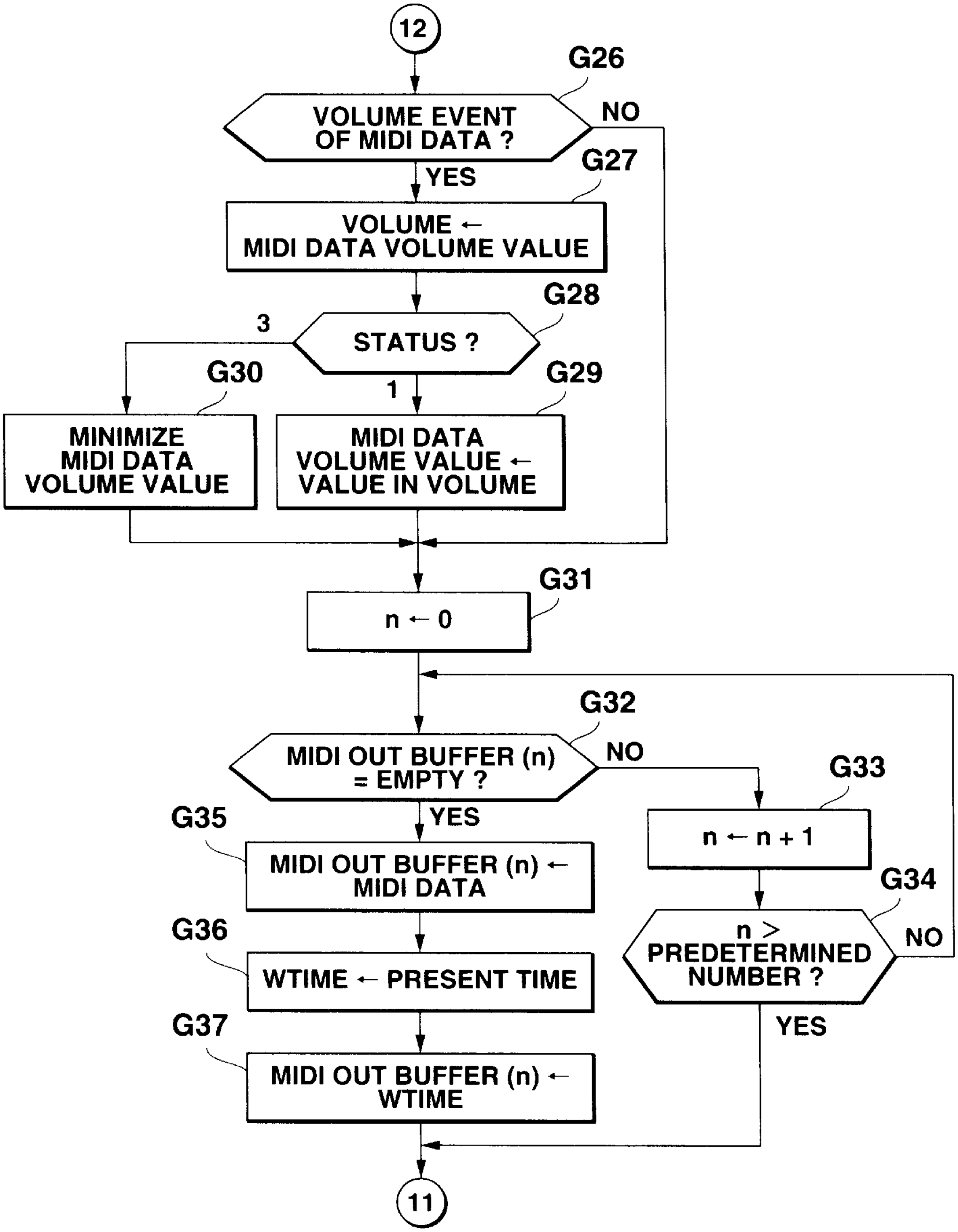
FIG. 13 is a flowchart of the remaining parts of the guide A process continuing from FIG. 12.

FIGS. 11–13 show a flowchart of the guide A process (step F2) of FIG. 10, in which the CPU 11 determines whether the start flag STF is 1 (step G1). If it is zero, which indicates that the performance is at a stop, the CPU 11 terminates this process. If the start flag STF is 1, the CPU 11 determines whether the value of the register STATUS is 2 (step G2). If it is 2, it is meant that no key is depressed although the timing of starting to produce a musical sound concerned has come. In that case, a wait mode is set which includes waiting key depression, and the CPU 11 then terminates this process.

When the value of the register STATUS is not 2 in step G2, the CPU 11 compares the present time and the sum of the time values in the registers ST and T or the timing when the musical sound is started to be produced (step G3). If the present time has not reached the timing when the musical sound is started to be produced, the CPU 11 then terminates this process.

When the present time has reached the timing when the musical sound is started to be produced, the CPU 11 increments the value of the address register AD (step G4). Then, the CPU 11 determines whether the value of the address register AD is END (step G5). If otherwise, the CPU 11 determines whether data at an address indicated by a value in the address register AD in the melody data storage area of the RAM 13 is time data (step G6). If it is time data, the CPU 11 determines whether the value of the mode register MODE is 1, which means that a musical sound is produced even when any key mode is depressed (step G7). If otherwise, the CPU 11 terminates this process.

When the value of the register MODE is 1, the CPU 11 determines whether the value of the register STATUS is 3 or 1 (step G8). If the value of the register STATUS is 3, the CPU 11 sets a minimum time contained in the MIDI data in the register ΔT (step G9). If the value of the register STATUS is 1, the CPU 11 sets data at the address indicated by the value in the address register AD in the register ΔT (step G10) After step G9 or G10, the CPU 11 adds the value of the time register T to the value of the register ΔT, terminates this process and then returns its control to the key guiding process of FIG. 10.

When the value in the address register AD is END in step G5, the CPU 11 instructs the sound source 3 and the LEDC 15 to mute the musical sound and stop light emission, respectively (step G12). The CPU 11 then inhibits the timer interrupt (step G13), resets the start flag STF to zero (step G14), and then terminates this process.

When data at the address indicated by the value in the address register AD is not time data, but event data in step G6, the CPU 11 determines whether the read data is note event data of the MIDI data in the flow of FIG. 12 (step G15). If it is note event data, the CPU 11 determines whether it is "note on" data (step G16). If it is "note on" data, the CPU 11 sets pitch data of the MIDI data in a register NOTE (step G17), and then causes an LED of a key corresponding to the value of the register NOTE to emit light (step G18).

The CPU 11 then determines whether the value of the register STATUS is 3 (step G19). If it is not 3 but 1, the CPU 11 changes the value of the register STATUS to 2 (step G20), and then terminates this process. That is, after causing the LED to emit light to guide the depression of a corresponding key, and when the value of the register STATUS is 1, the CPU 11 changes the value of the register STATUS to 2, and stops reading out the melody data until the key is depressed.

When the register STATUS is 3 in step G19, the CPU 11 changes the value of the register STATUS to 1 (step G21), and creates MIDI data based on a value of a register VOLUME (step G22). That is, after causing the LED to emit light to guide the depression of a corresponding key, and the value of the register STATUS is 3, a volume value of the MIDI data is minimum. The CPU 11 restores the original volume value and creates corresponding MIDI data.

When the MIDI data is not "note on" data in step G16, the CPU 11 determines whether it is "note off" data (step G23). If it is "note off" data, the CPU 11 sets pitch data of the MIDI data in the register NOTE (step G24), turns off an LED for a key corresponding to the value of the register NOTE (step G25), shifts its control to step G4 of FIG. 11, where the CPU 11 increments the value of the address register AD, and then repeats the above-mentioned steps concerned.

When the read data is not event data in step G15 of FIG. 12 or after the CPU 11 restores the original volume value and creates the corresponding MIDI data in step G22, the CPU 11 determines whether the read data is volume event data (velocity data) of the MIDI data (step G26). If it is volume event data, the CPU 11 sets the volume value of the MIDI data in the register VOLUME (step G27).

Then, the CPU 11 determines whether the value of the register STATUS is 1 or 3 (step G28). If it is 1, the CPU 11 changes the volume value of the MIDI data to the value of the register VOLUME (step G29) or returns the volume value of the MIDI data to its original value (actually, step G29 implies NOP). When the value of the register STATUS is 3, the CPU 11 sets the volume value of the MIDI data to a minimum value (step G30). The minimum value is a very small volume value which we can hardly hear or alternatively may be zero.

After the volume value is set to the minimum value in step G30 or the volume value is restored in step G29 or the data read out in step G26 is not volume event data of the MIDI data, that is, is key on/off event data, the CPU 11 prepares for delivering the MIDI data to the sound source 3. In this case, the CPU 11 sets to zero a pointer n which specifies a channel of one of MIDI OUT buffers and hence a corresponding MIDI OUT (n) (step G31), and then increments the value of the pointer n while writing MIDI data to the MIDI OUT buffer (n) which represents the MIDI OUT buffer for the channel specified by the value of the pointer n. In this case, the CPU 11 determines whether a MIDI OUT buffer (n) specified by the pointer n is empty (step G32). If it is not empty, the CPU 11 increments the value of the pointer n (step G33), and determines whether n has exceeded a predetermined number (step G34). If the value of the pointer n has not exceeded the predetermined number, the CPU 11 determines in step G32 whether the MIDI OUT buffer (n) is empty.

If it is empty, the CPU 11 stores the MIDI data in an event area of MIDI OUT buffer (n) (step G35). The CPU 11 also stores data representing the present time in a register WTIME (step G36), and also time data in the register WTIME or the present time in a time area of the MIDI OUT buffer (n) (step G37). Then or when the value of the pointer n has exceeded the predetermined number in step G34, the CPU 11 shifts its control to step G4 of FIG. 11, where it increment the value of the address register AD.

Figure 14:
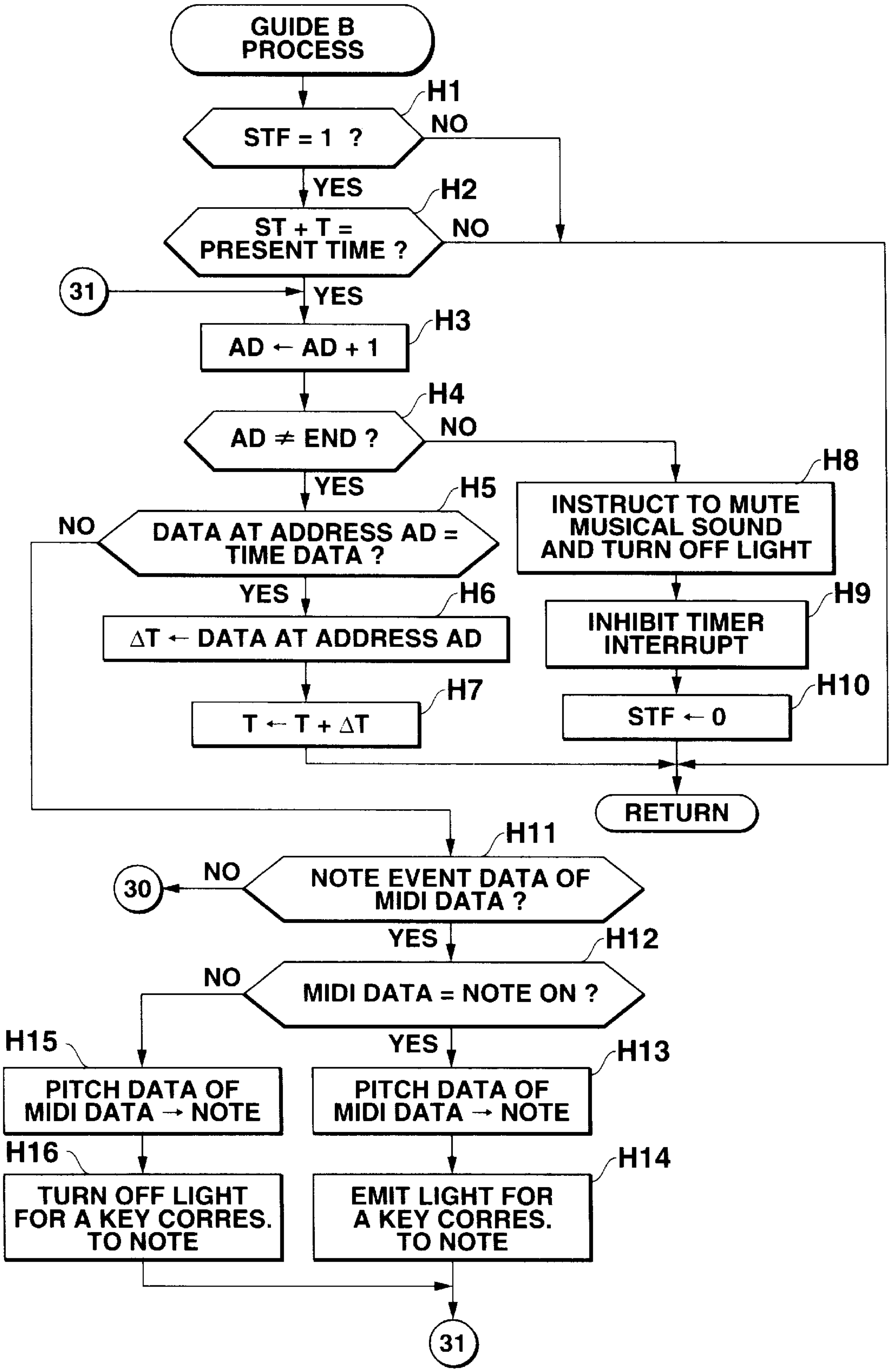
FIG. 14 is a flowchart of a part of a guide B process as a part the key guiding process of FIG. 10.
Figure 15:
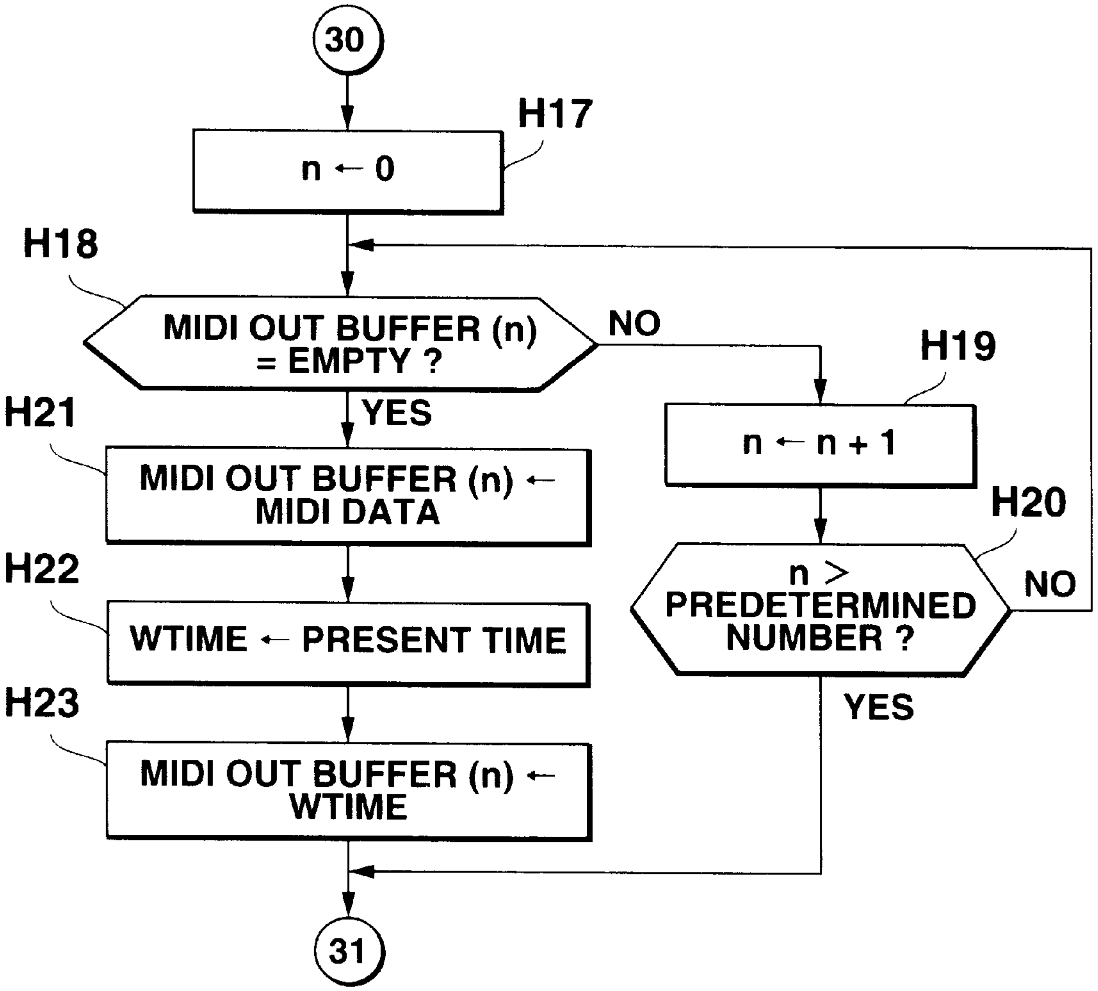
FIG. 15 is a flowchart of the remaining part of the guide B process continuing from FIG. 14.

FIGS. 14 and 15 together form a flowchart of the guide B process (step F4) in the key guiding process of FIG. 10. In this process, the CPU 11 determines whether the start flag STF is 1 (step H1). If it is zero, which indicates a performance stop state, the CPU 11 terminates this process. If the flag STF is 1, the CPU 11 determines whether the present time coincides with the sum of the time values of the registers ST and T or the timing when a musical sound starts to be produced (step H2). If otherwise, the CPU 11 terminates this process.

When the present time coincides with the timing when the musical sound starts to be produced, the CPU 11 increments the value of the address register AD (step H3) , and then determines whether the value of the address register AD is END (step H4). If otherwise, the CPU 11 determines whether data at the address indicated by the value in the address register AD is time data (step H5). If it is time data, the CPU 11 sets in the register ΔT the data at the address indicated by the value of the address register AD in the RAM 13 (step H6). The CPU 11 then adds the value of the register ΔT to the value of the register T (step G7), terminates this process, and then returns its control to the key guiding process of FIG. 10.

When the data at the address indicated by the value of the address register AD is END in step H4, the CPU 11 instructs the sound source and the LEDC 15 to mute the musical sounds and stop light emission, respectively (step H8). The CPU 11 then inhibits the timer interrupt (step H9), resets the start flag STF to zero (step H10), terminates this process and then returns its control to the key guiding process of FIG. 10.

When the data at the address indicated by the value in the address register AD is not time data, but event data in step H5, the CPU 11 determines whether the read data is note event data of the MIDI data (step H11). If it is note event data, the CPU 11 determines whether it is "note on" data (step H12). If it is "note on" data, the CPU 11 sets pitch data of the MIDI data in the register NOTE (step H13), and then causes an LED of a key corresponding to the value of the register NOTE to emit light (step H14).

When the MIDI data is not "note on" data, but "note off"" data in step H12, the CPU 11 sets the pitch data of the MIDI data in the register NOTE (step H15), and then turns off an LED for a key corresponding to the pitch data of the MIDI data in the register NOTE (step H16).

After turning on or off the corresponding LED in step H14 or H16, the CPU 11 shifts its control to step H3, where it increments the value of the register AD, and then repeats the above-mentioned steps concerned.

After the data read out in step H11 is not note event data of the MIDI data, that is, is "key on event" data, the CPU 11 sets to zero the value of the pointer n which specifies a channel of a MIDI OUT buffer (step H17 of FIG. 15), increments the pointer n while writing MIDI data to MIDI OUT buffer (n). In this case, the CPU 11 determines whether the MIDI OUT buffer (n) specified by the value of the pointer n is empty (step H18). If it is not empty, the CPU 11 increments the value of the pointer n (step H19), and determines whether the value of the pointer n has exceeded a predetermined number (step H20). If the value of the pointer n has not exceeded the predetermined number, the CPU 11 determines in step H18 whether the MIDI OUT buffer (n) is empty.

If it is empty, the CPU 11 stores the MIDI data in the event area of MIDI OUT buffer (n) (step H21). The CPU 11 also stores the present time data in a register WTIME (step H22), and also time data in the register WTIME (or the present time) in the time area of the MIDI OUT buffer (n) (step H29). Then or when the value of the pointer n has exceeded the predetermined number in step H29, the CPU 11 shifts its control to step H3 of FIG. 11, where it increment the value of the address register AD.

Figure 16:
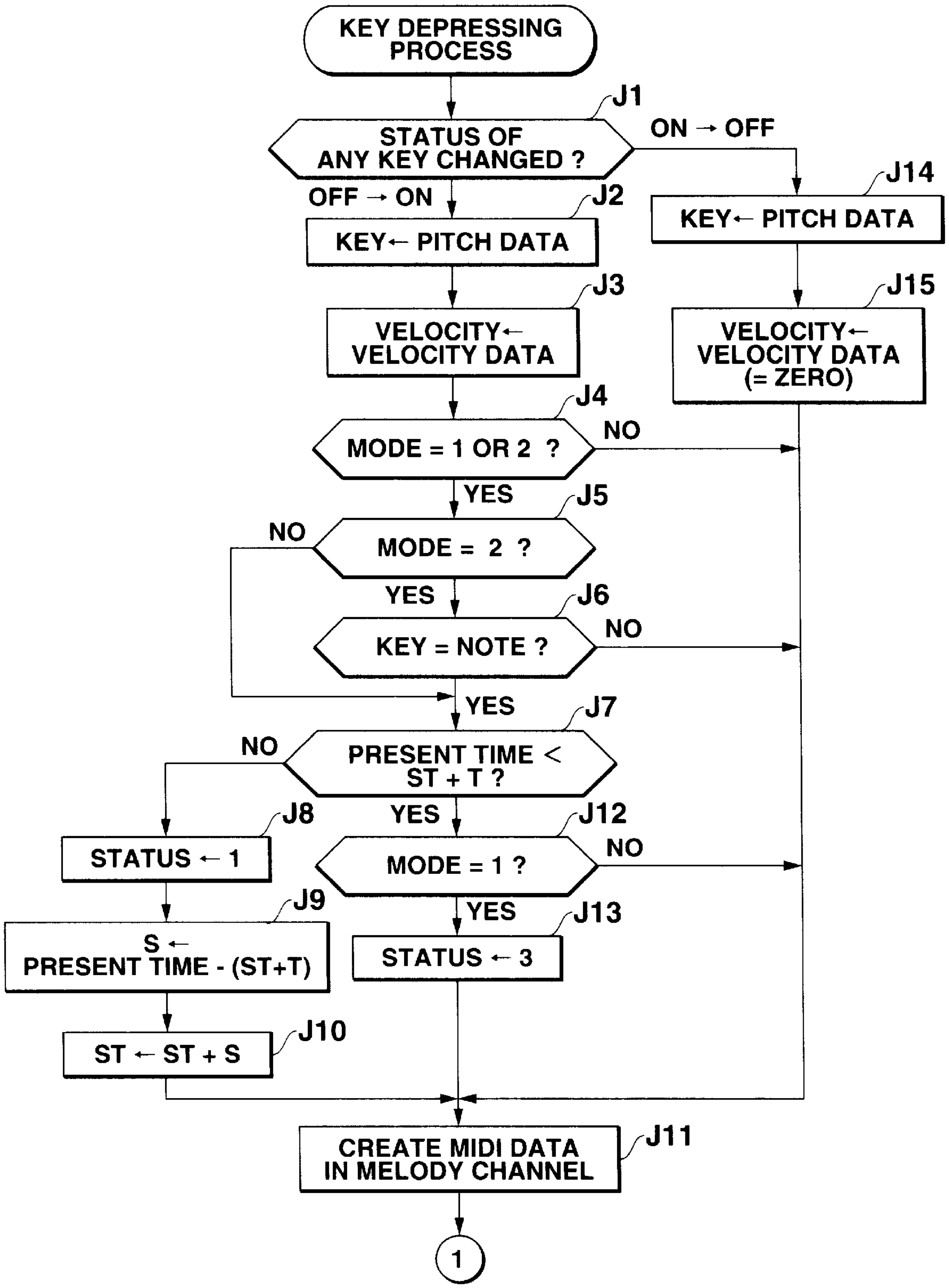
FIG. 16 is a flowchart of a part of a key depressing process of the flowchart of FIG. 5.
Figure 17:
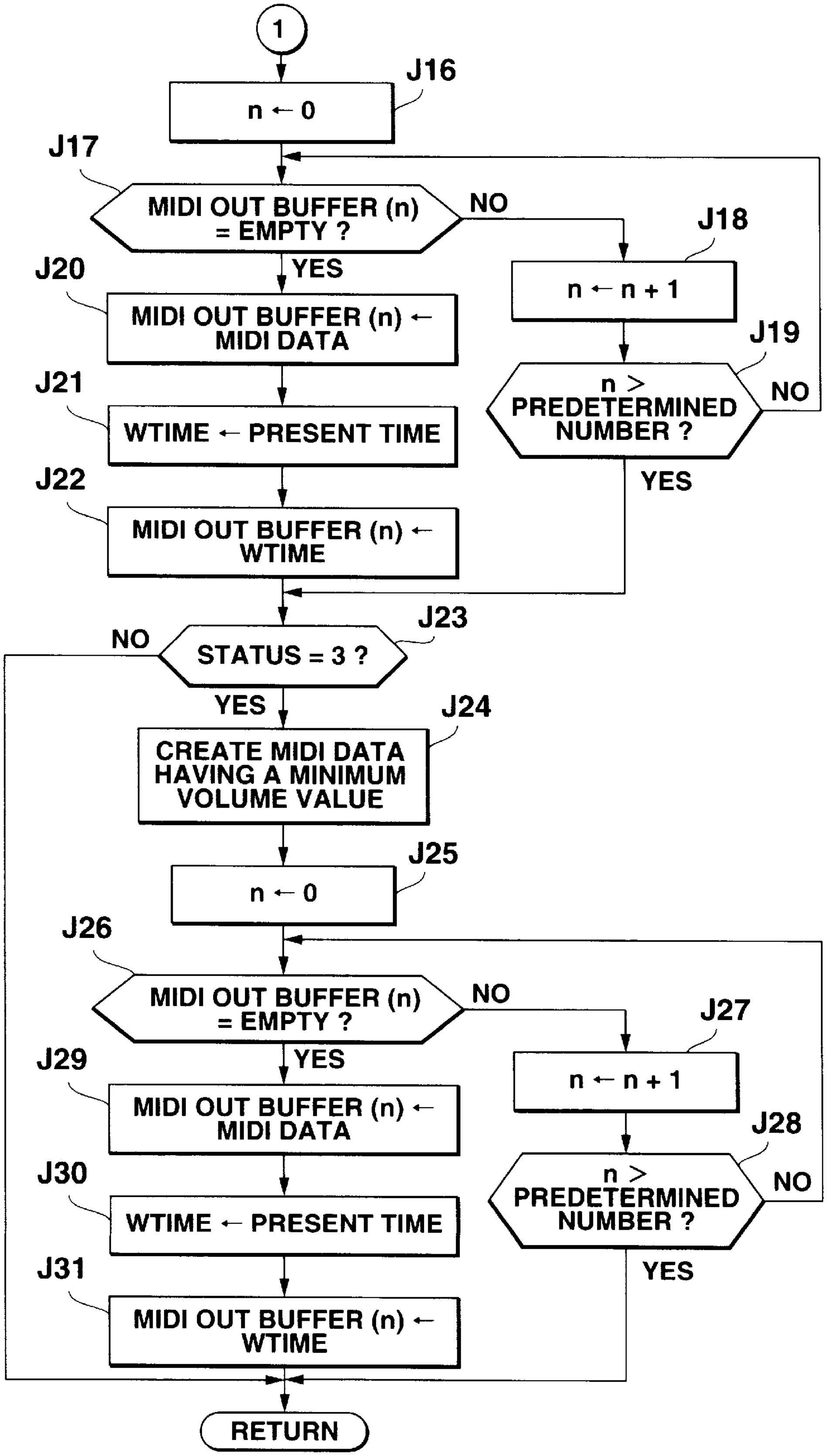
FIG. 17 is a flowchart of the remaining part of the key depressing process continuing from FIG. 16.

FIGS. 16 and 17 together form a flowchart of a key depressing step A4 of the main flow of FIG. 5. First, the CPU 11 determines whether the status of any key has changed (step J1). If otherwise, the CPU 11 returns its control to the main flow. If the key has been depressed, the CPU 11 stores pitch data on the key in a register KEY (step J2), and also velocity data representing the intensity of depression of the key in a register VELOCITY (step J3).

The CPU 11 then determines whether the value of the mode register MODE is 1 or 2 (step J4) or whether the set mode is a key depression wait mode. When the value of the register MODE is 1 or 2, the CPU 11 then further determines whether the value of the mode register MODE is 2 (step J5) or whether the set mode is a mode in which a correct key guided so to be depressed is waited. If the value of the mode register MODE is 2, the CPU 11 determines whether the number of the key to be depressed and represented by the register KEY coincides with note data of the MIDI data represented by the value of the register NOTE (step J6).

If the value of the register KEY coincides with the value of the register NOTE or when the value of the register MODE is 1 in step J5 and a "ANY key" mode is set where a musical sound is produced by depression of any key, the CPU 11 determines whether the present time has not reached the sum of the time data of the register ST and T (step J7) or whether the present time has not reached the timing when the musical sound starts to be produced.

When the present time has reached the timing, the CPU 11 sets 1 to the value of the register STATUS, subtracts the sum of the time data of the register ST and T from the present time, and stores the difference in a difference register S (step J9), and adds the value of the register S to the time data of the register ST (step J10) to update the value of the register ST, and then creates MIDI data for a melody channel concerned (step J11).

If otherwise in step J7, the CPU 11 determines whether the value of the register MODE is 1 (step J12) or whether the "ANY key" mode is set. When the value of the register MODE is 1, the CPU 11 sets the value of the register STATUS to 3 (step J13). That is, when a key is depressed before the timing when a corresponding musical sound starts to be produced comes, the CPU 11 sets a mode in which the relevant portion of the melody data to be read and fed in a time period between the time when the key was depressed and the timing when the musical sound starts to be produced comes is read and fed rapidly, and then creates MIDI data of a melody (step J11).

When the key is released from its depression in step J1, the CPU 11 stores in the register KEY data representing the pitch of the musical sound produced last by depression of the key before the key was released (step J14), sets the value of the register VELOCITY to zero (step J15), and creates MIDI data of the melody (step J11).

When the value of the register MODE is neither 1 or 2, but 3 in step J4, or when the value of the register KEY does not coincide with the value of the register NOTE in step J6, that is, when a key different from the key which the user was guided to depress has been depressed or the value of the register MODE is not 1 in step J12, the CPU 11 creates MIDI data of the melody (step J11).

Then, in FIG. 17 the CPU 11 sets the value of the pointer n which specifies the MIDI OUT buffer to zero (step J16), increments the value of the pointer n while setting the MIDI data in MIDI OUT buffer (n). That is, the CPU. 11 determines whether the MIDI OUT buffer (n) is empty (step J17). If otherwise, the CPU 11 increments the value of the pointer n (step J18), and then determines whether the value of the pointer n has exceeded a predetermined number (step J19). If otherwise, the CPU 11 shifts its control to step J17, where it determines whether the MIDI OUT buffer (n) is empty.

If the MIDI OUT buffer (n) is empty, the CPU 11 stores the MIDI data in an event area of the MIDI OUT buffer (n) (step J20). The CPU 11 stores the present time data in the register WTIME (step J21), and also stores the present time data in the register WTIME in the time area of the MIDI OUT buffer (n) (step J22). Then, or when the value of the pointer n has exceeded the predetermined number instep J19, the CPU 11 then determines whether the value of the register STATUS is 3 (step J23). If otherwise, the CPU 11 terminates this process. That the value of the register STATUS is 3 implies that a key has been depressed before the timing when the musical sound for the MIDI data starts to be produced has come. Thus, the CPU 11 effects a process for feeding the MIDI data rapidly.

In this case, the CPU 11 creates MIDI data in which the volume value is minimum (step J24), sets to zero the value of the pointer n which specifies a MIDI OUT buffer (step J25), and then increments the value of the pointer n while storing the created MIDI data in the MIDI OUT buffer (n). Then, the CPU 11 determines whether the MIDI OUT buffer (n) specified by the value of the pointer n is empty (step J26). If otherwise, the CPU 11 increments the value of the pointer n (step J27), and determines whether the value of the pointer n has exceeded the predetermined number (step J28). If otherwise, the CPU 11 determines in step J26 whether the MIDI OUT buffer (n) is empty.

If the MIDI OUT buffer (n) is empty, the CPU 11 stores the MIDI data in the event area of the MIDI OUT buffer (n) (step J29). The CPU 11 further stores the present time data in the register WTIME (step J30), and also stores the present time data in the register WTIME in the time area of the MIDI OUT buffer (n) (step J31). Then, or when the value of the pointer n has exceeded the predetermined number in step J28, the CPU 11 then terminates this process and returns its control to the flow of FIG. 5.

Figure 18:
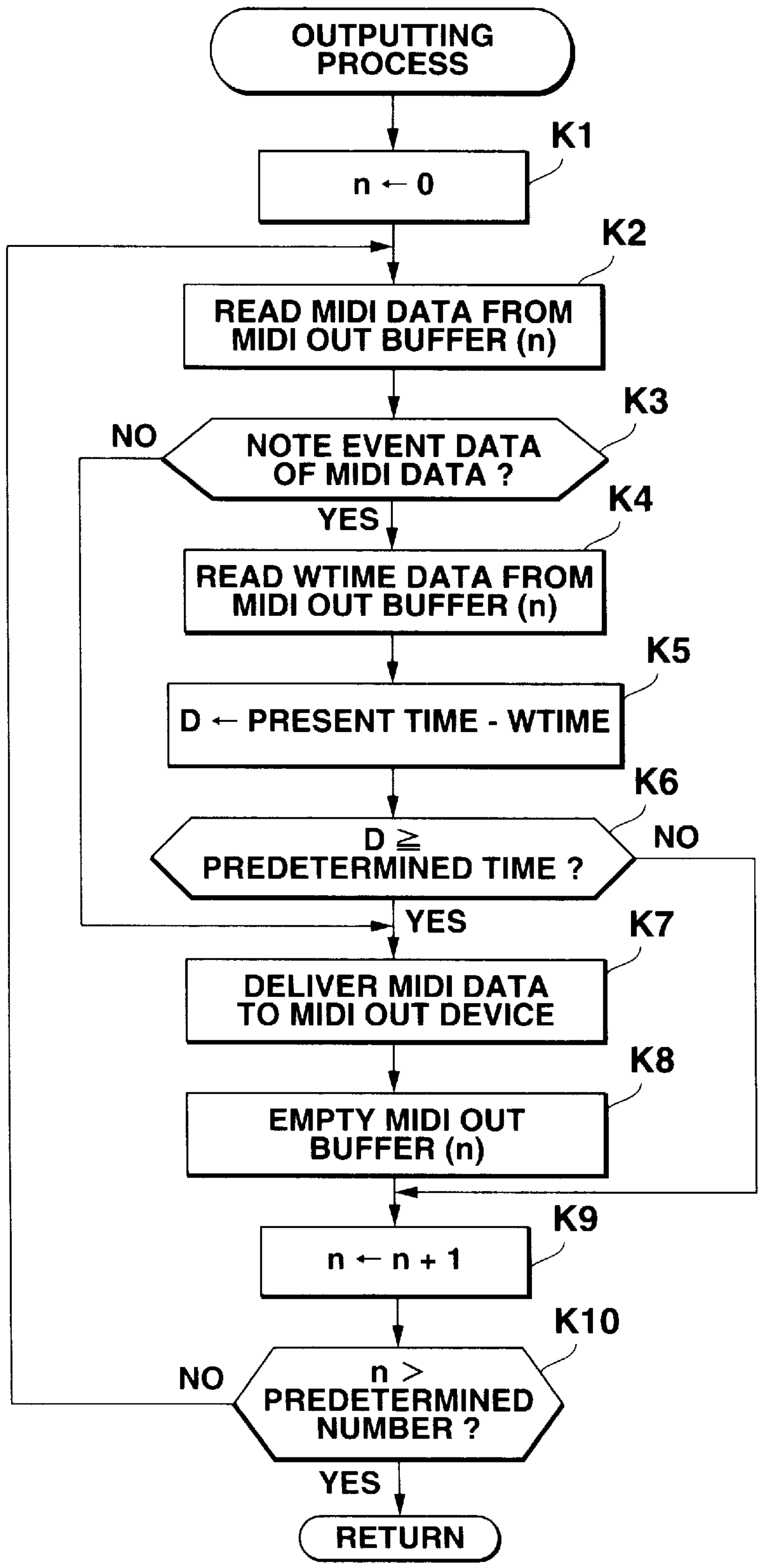
FIG. 18 is a flowchart of an outputting process of the flowchart of FIG. 5.

FIG. 18 is a flowchart of the outputting process (step A6) of the flow of FIG. 5. In this process, the CPU 11 sets the pointer specifying a MIDI OUT buffer to zero representing the head address of the buffer (step K1), and increments the value of the pointer n while effecting the following outputting process. That is, the CPU 11 reads out MIDI data from the MIDI OUT buffer (n) specified by the value of the pointer n (step K2), and then determines whether the read data is "note event" data of the MIDI data (step K3).

If it is "note event" data, the CPU 11 reads out time data in the register WTIME for the "note event" data from the MIDI OUT buffer (n) (step K4), subtracts the time in the register WTIME from the present time, sets a time difference as the result of the subtraction in a register D (step K5), and then determines whether the value of the register D has exceeded the predetermined value (step K6).

When the value of the register D has exceeded the predetermined value or when the MIDI data read out in step K3 is not "note event" data but volume data, the CPU 11 provides the MIDI data to the MIDI OUT device (the MIDI sound source 3 of FIG. 1) (step K7), and then empties the MIDI OUT buffer (n) (step K8). Then, or when the value of the register D is smaller than the predetermined value in step KG, the CPU 11 increments the value of the pointer n (step K9), and then determines whether the value of the pointer n has exceeded the predetermined value (step K10). If otherwise, the CPU 11 shifts its control to step K2, where it retreats a looping process involving steps K2–K10. When the value of the pointer n has exceeded the predetermined number, the CPU 11 terminates this process and then returns its control to the start of the main flow of FIG. 5.

Figure 19:
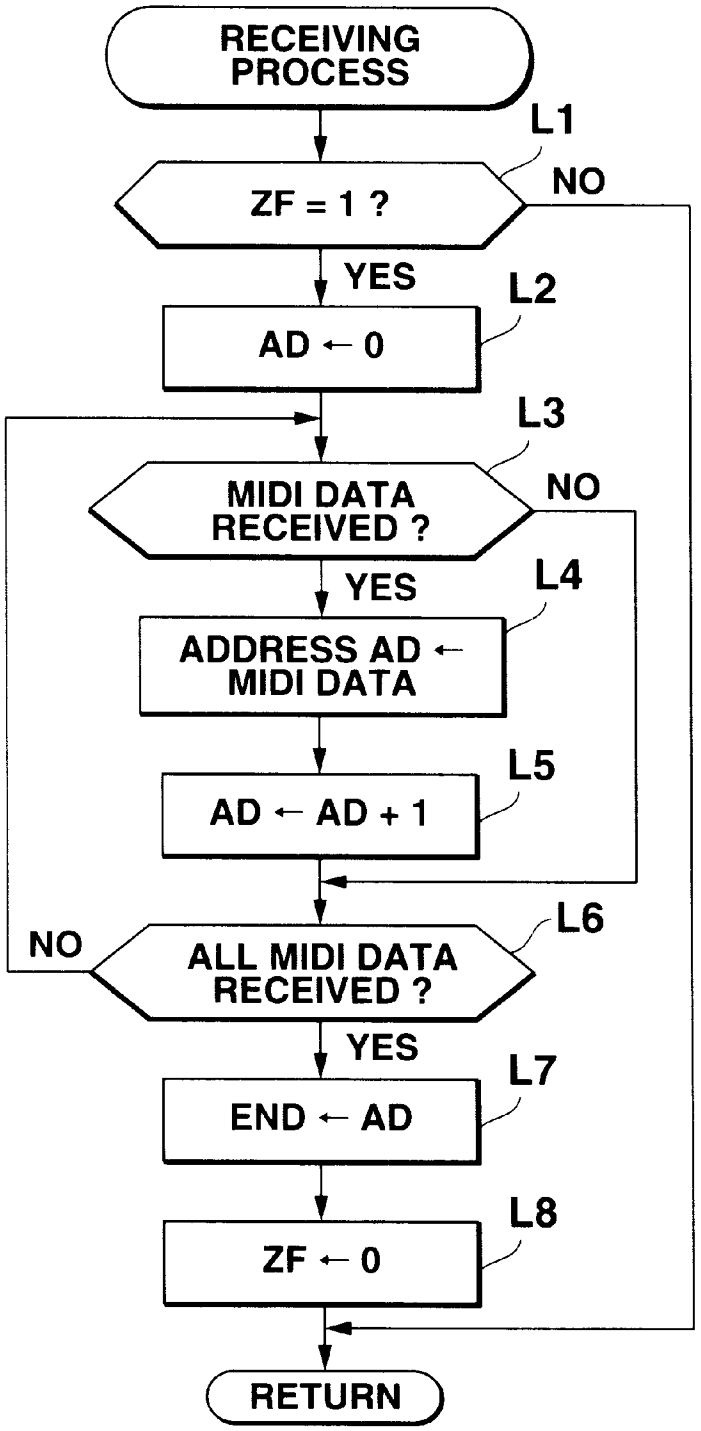
FIG. 19 is a flowchart of a receiving process of the flowchart of FIG. 5.

FIG. 19 is a flowchart of the receiving process (step A7) of the main flow. In this process, the CPU 11 determines whether the reception flag ZF is 1 (step L1). If the flag ZF is zero, the CPU 11 terminates this process. When the flag ZF is 1, which represents a request for an access to the melody data server 5, the CPU 11 sets the value of the address register AD to zero (step L2), and then increments the value of the address register AD while effecting the following looping process.

The CPU 11 determines through the modem 17 whether MIDI data has been received (step L3) If it has been received, the CPU 11 stores the MIDI data at a location specified by the value of the address register AD (step L4), increments the value of the address register AD, and then specifies a next location (step L5). Then, the CPU 11 determines whether the reception of MIDI data has been terminated (step L6). If otherwise, the CPU 11 shifts its control to step L3, where it determines whether MIDI data has been received.

When the reception of the MIDI data is terminated in step L6, the CPU 11 sets the value of the address register AD in a register END (step L7), resets the reception flag ZF to zero (step L8), and then returns its control to the start of the main flow of FIG. 5.

As described above, according to the present embodiment, when a key to be depressed to perform a melody is not depressed after the timing at which a musical sound of event data concerned starts to be produced has passed, reading the melody data is stopped until the key is depressed. When the key is depressed before the timing at which the musical sound starts to be produced comes, relevant melody data to be fed and read in a time period between the time when the key was depressed and the time when the timing at which the musical sound starts to be produced comes is rapidly fed and read out. Thus, even when key depression for a performance is effected before the timing when the musical sound starts to be produced comes in the navigation function of guiding key depression for the performance, the performer can perform the melody at a proper tempo without feeling that something is wrong, and can synchronize his or her performance of the melody with performance of another part for the melody.

In this case, when the CPU 11 controls the musical sound producing conditions based on control data contained in the melody data and rapidly fed and read out by the time when the timing comes, it processes the control data like control data read out in a general reading manner. Thus, when the rapidly fed and read out melody data contains a program change command which changes a tone quality of the musical sound concerned during the time period when the melody data was rapidly fed and read out, the CPU 11 changes the tone quality of the musical sound in accordance with the MIDI data after the time period ends.

As described above, the CPU 11 changes to a minimum the volume of the musical sound produced in the time period when the melody data is rapidly fed and read to thereby suppress a noisy sound in the period.

While in the embodiment the keyboard device, which includes the modem 17, FDDC 16 and FDD 21 as shown in FIGS. 1 and 2, has been illustrated, the present invention is not limited to the embodiment. A system of another embodiment is shown in FIGS. 20 and 21.

Figure 20:
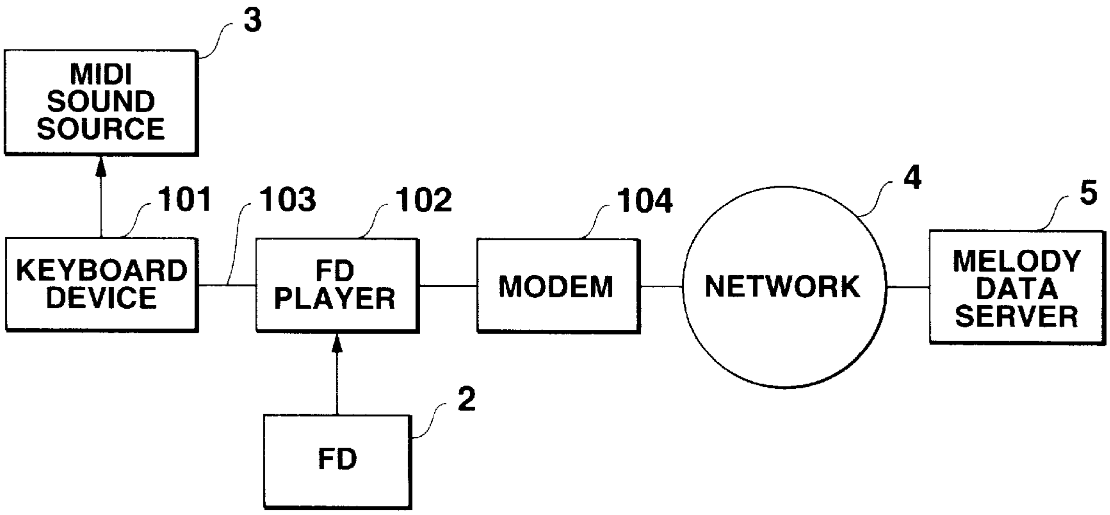
FIG. 20 illustrates the composition of a system as another embodiment.

In FIG. 20, a keyboard 101 is connected to a FD player 102 which drives a FD (floppy disk) 2 via a serial interface 103 which includes a RS-232C. The FD player 102 is connected to a modem 104 which is arranged to connect to a network 4 so as to receive MIDI data from a melody data sever 5 and store it in the FD 2. The keyboard device 101 sends/receives commands and MIDI data to/from the FD player 102. As in the above embodiment, when no target key is depressed after a timing when a musical sound of event data starts to be produced has passed, the CPU 11 stops reading melody data until the key is depressed. When the target key is depressed before the timing when the musical sound starts to be produced comes, the CPU 11 causes the relevant melody data to be rapidly fed and read in a time period between the time when the key was depressed and the time when the timing at which the musical sound starts to be produced comes to be rapidly fed and read out.

Figure 21:
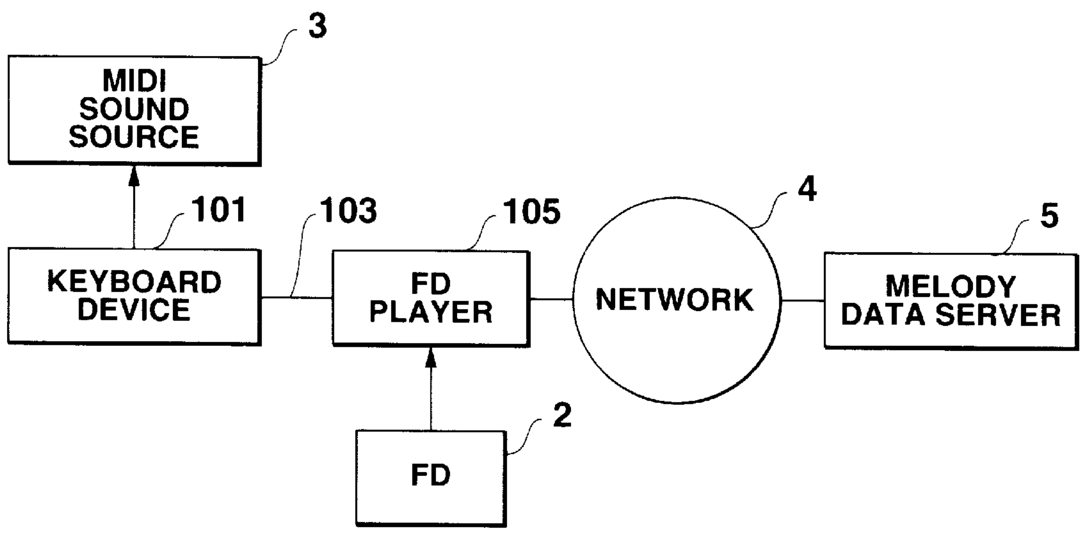
FIG. 21 illustrates the composition of a system as still another embodiment.

In the arrangement of FIG. 21, the FD player 105 includes a built-in modem (not shown). As in the above embodiment, the keyboard device 101 sends/receives commands and MIDI data to/from the FD player 102. As in the above embodiment, when no target key is depressed after the timing when the musical sound starts to be produced has passed, the CPU 11 stops reading melody data until the is depressed. When the target key is depressed before the timing when the musical sound starts to be produced comes, the CPU 11 causes the relevant melody data to be fed and read in a time period between the time when the key was depressed and the time when the timing at which the musical sound starts to be produced comes to be rapidly fed and read.

While in the present embodiment the ROM 12 of the keyboard device 1 is illustrated as containing a melody performance training program to thereby execute a melody performance training process, a floppy disk, a CD or another recording medium may contain a melody performance training program to cause an information processor such as a general personal computer to perform the program.

Figure 22:
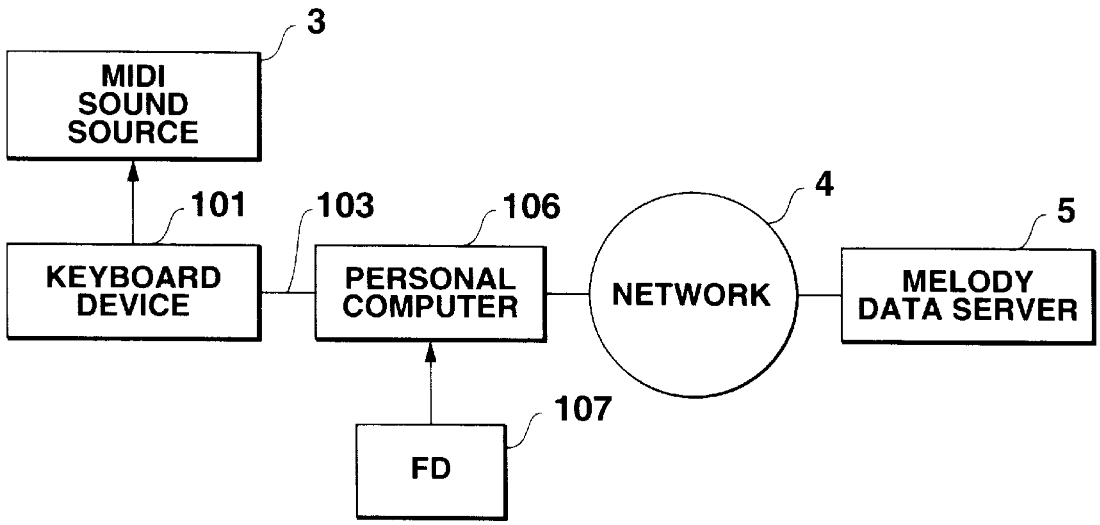
FIG. 22 illustrates the composition of a system as a further embodiment.

For example, in the arrangement of FIG. 22, a FD 107 contains a melody performance-training program. A personal computer 106 drives the FD 107 to execute the melody performance-training program. The personal computer 106 includes a modem (not shown) to communicate with a network 4, and receives MIDI data from a melody data sever 5. The personal computer 106 also sends/receives commands/MIDI data to/from a keyboard device 101 through a serial interface 103.

In this case, the FD 107 is connected via a telecommunication line to an external device, and contains a performance training program which includes the steps of receiving melody data containing event data on production of a musical sound, and time data indicative of a timing at which the musical sound of the event data starts to be produced; storing the received melody data in a predetermined storage device; reading the melody data stored in the storage device; guiding a key to perform the event data read out by the data reading step based on the event data; stopping the reading of the melody data until a key is depressed when the key is not depressed after the timing at which a musical sound of the event data starts to be produced has elapsed; and when the key is operated before the timing at which the musical sound starts to be produced comes, rapidly feeding the relevant melody data to be fed and read in a time period between the time when the key was depressed and the time when the timing at which the musical sound starts to be produced comes to be fed and read.

When melody data is recorded beforehand in the FD 107, the personal computer 106 directly reads the melody data. In this case, the FD 107 contains a program which includes the steps of reading from predetermined storage means melody data containing event data on the production of a musical sound and time data indicative of a timing when the musical sound of the event data starts to be produced; guiding a key to perform the event data read out by the data reading step based on the event data; stopping the reading of the melody data until a key is depressed when the key is not depressed after the timing at which the musical sound starts to be produced has elapsed; and when the key is operated before the timing at which the musical sound starts to be produced comes, rapidly feeding the relevant melody data to be fed and read in a time period between the time when the key was depressed and the time when the timing at which the musical sound starts to be produced comes to be fed and read.

What is claimed is:

1. A melody performance training apparatus comprising:

a plurality of elements to be actuated for performing a melody;

storage means which contains melody data which includes a plurality of pairs of event data representing one of the plurality of elements to be actuated, and corresponding time data representing a timing when the element represented by the event data is to be actuated;

data reading means for sequentially reading the plurality of pairs of event data and time data included in the melody data from the storage means; and reading control means, responsive to a particular one of the plurality of elements represented by event data of one of the plurality of pairs of event data and corresponding time data read by the data reading means being not actuated even when a timing at which the particular element is to be actuated has come, the timing being represented by the time data corresponding to the event data read out by the data reading means, for stopping the data reading means from reading the remaining portion of the melody data until the particular element is actuated, and responsive to the particular element being actuated before the timing when the particular element is to be actuated, for causing the data reading means to rapidly read from the storage means a relevant portion of the melody data to be read in a time period between the time when the particular element was actuated and a time when the timing at which the particular element is to be actuated comes.

2. The melody performance training apparatus according to claim 1, wherein said storage means further contains as the melody data volume control event data for controlling a volume of a musical sound to be produced, and wherein said reading control means comprises volume control means, responsive to said data reading means reading the volume control event data in the time period between the time when the particular element was actuated and the time when the timing at which the particular element is to be actuated comes, for changing the contents of the read volume control event data so as to minimize a volume of the musical sound to be produced.

3. A melody performance training apparatus comprising:

a plurality of elements to be actuated for performing a melody;

storage means which contains melody data which includes a plurality of pairs of event data representing one of the plurality of elements to be actuated, and corresponding time data representing a timing when the element represented by the event data is to be actuated;

data reading means for sequentially reading the plurality of pairs of event data and corresponding time data included in the melody data from the storage means;

performance specifying means, responsive to the event data read by the data reading means representing a particular one of the plurality of elements to be actuated, for specifying the particular element; and reading control means, responsive to the particular element being not actuated even when a timing at which the particular element is to be actuated has come, the timing being represented by the time data corresponding to the event data read out by said data reading means, for stopping the data reading means from reading the remaining portion of the melody data until the particular element is actuated, and responsive to the particular element being actuated before the timing when the particular element is to be actuated, for causing the data reading means to rapidly read from the storage means a relevant portion of the melody data to be read in a time period between the time when the particular element was actuated and a time when the timing at which the particular element is to be actuated comes.

4. The melody performance training apparatus according to claim 3, wherein said storage means further contains as the melody data volume control event data for controlling a volume of a musical sound to be produced, and wherein said reading control means comprises volume control means, responsive to said data reading means reading the volume control event data in the time period between the time when the particular element was actuated and the time when the timing at which the particular element is to be actuated comes, for changing the contents of the read volume control event data so as to minimize a volume of the musical sound to be produced.

5. A recording medium which contains a computer readable program for causing a computer to perform a process which comprises the steps of:

sequentially reading a plurality of pairs of event data representing one of a plurality of elements to be actuated for performing a melody, and corresponding time data representing a timing when the element represented by the event data is to be actuated, the plurality of pairs of event data and corresponding time data composing melody data, from storage means which contains the melody data; and in response to a particular one of the plurality of elements represented by event data of one of the plurality of event data and corresponding time data read in the reading step being not actuated even when a timing at which the particular element is to be actuated has come, the timing being represented by the time data corresponding to the event data read out in the data reading step, stopping the reading step from reading the remaining portion of the melody data until the particular element is actuated, and in response to the particular element being actuated before the timing when the particular element is to be actuated, causing the reading step to rapidly read a relevant portion of the melody data to be read in a time period between the time when the particular element was actuated and the time when the timing at which the particular element is to be actuated comes.

6. The recording medium according to claim 5, wherein said storage means further contains as the melody data volume control event data for controlling a volume of the musical sound to be produced, and wherein the reading control step comprises a volume control step, responsive to said data reading step reading the volume control event data in the time period between the time when the particular element was actuated and the time when the timing at which the particular element is to be actuated comes, for changing the contents of the read volume control event data so as to minimize a volume of the musical sound to be produced.

7. A recording medium which contains a computer readable program for causing a computer to perform a process which comprises the steps of:

sequentially reading a plurality of pairs of event data representing one of a plurality of elements to be actuated for performing a melody, and corresponding time data representing a timing when the element represented by the event data is to be actuated, the plurality of pairs of event data and corresponding time data composing melody data, from storage means which contains the melody data;

in response to the data reading step reading event data of one of the plurality of pairs of event data and corresponding time data which represents a particular one of the plurality of elements to be actuated, specifying the particular element; and in response to the particular element being not actuated even when a timing at which the particular element is to be actuated has come, the timing being represented by the time data corresponding to the event data read out in said reading step, stopping said reading step from reading the remaining portion of the melody data until the particular element is actuated, and in response to the particular element being actuated before the timing when the particular element is to be actuated, causing the reading step to rapidly read a relevant portion of the melody data to be read in a time period between the time when the particular element was actuated and the time when the timing at which the particular element is to be actuated comes.

8. The recording medium according to claim 7, wherein said storage means further contains as the melody data volume control event data for controlling a volume of the musical sound to be produced, and wherein said reading control step comprises volume control step, responsive to said data reading step reading the volume control event data in the time period between the time when the particular element was actuated and the time when the timing at which the particular element is to be actuated comes, for changing the contents of the read volume control event data so as to minimize a volume of the musical sound to be produced.

* * * * *